United States Patent
Xing

(10) Patent No.: US 10,285,109 B2
(45) Date of Patent: May 7, 2019

(54) WIRELESS CONNECTION ESTABLISHMENT METHOD AND APPARATUS

(71) Applicant: HUAWEI TECHNOLOGIES CO., LTD., Shenzhen, Guangdong (CN)

(72) Inventor: Pingping Xing, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 88 days.

(21) Appl. No.: 15/260,500

(22) Filed: Sep. 9, 2016

(65) Prior Publication Data
US 2017/0006518 A1    Jan. 5, 2017

Related U.S. Application Data

(63) Continuation of application No. PCT/CN2014/073186, filed on Mar. 11, 2014.

(51) Int. Cl.
H04W 36/00    (2009.01)
H04W 36/38    (2009.01)
(Continued)

(52) U.S. Cl.
CPC ....... *H04W 36/38* (2013.01); *H04W 36/0066* (2013.01); *H04W 36/08* (2013.01); *H04W 76/10* (2018.02)

(58) Field of Classification Search
CPC ........... H04W 72/042; H04W 72/0446; H04W 76/046; H04W 72/0413; H04W 74/0833
See application file for complete search history.

(56) References Cited

U.S. PATENT DOCUMENTS

2005/0201412 A1    9/2005    Philippe Janneteau et al.
2008/0107014 A1*   5/2008    Huang .................. H04W 28/16
                                                    370/216
(Continued)

FOREIGN PATENT DOCUMENTS

| CN | 1461574 A | 12/2003 |
| CN | 1672373 A | 9/2005 |
| CN | 1860808 | 11/2006 |
| CN | 1960320 | 5/2007 |
| CN | 2013074340 | * 4/2013 |

(Continued)

OTHER PUBLICATIONS

Li et al. CN 2013074340, Machine Translation.*
(Continued)

*Primary Examiner* — Khalid W Shaheed
(74) *Attorney, Agent, or Firm* — Staas & Halsey LLP

(57) ABSTRACT

The present application provide a method includes: establishing, by a base station, a CP connection to a UE according to a configuration parameter of the CP connection and a UP connection to the UE according to a configuration parameter of the UP connection, where a transmission channel occupied by the CP connection which is indicated by the configuration parameter of the CP connection is different from the transmission channel occupied by the UP connection which is indicated by the configuration parameter of the UP connection, and transmission channels occupied by the CP connection and UP connection are also different. Therefore, the CP connection and the UP connection are not interrupted at the same time, which leads to no call drop occurring in a communication connection and improves user experience; and reduces a time delay, increases a network throughput, and further improves data transmission flexibility in an UP connection.

20 Claims, 10 Drawing Sheets

(51) Int. Cl.
*H04W 36/08* (2009.01)
*H04W 76/10* (2018.01)

(56) References Cited

U.S. PATENT DOCUMENTS

| | | | |
|---|---|---|---|
| 2009/0016245 | A1 | 1/2009 | Karls |
| 2010/0014450 | A1* | 1/2010 | Chun .................. H04L 12/189 370/312 |
| 2012/0163296 | A1 | 6/2012 | Cheon et al. |
| 2013/0142145 | A1 | 6/2013 | Choi |
| 2016/0007243 | A1* | 1/2016 | Park .................. H04W 36/0033 370/331 |

FOREIGN PATENT DOCUMENTS

| | | |
|---|---|---|
| CN | 103517351 | 1/2014 |
| EP | 1380182 B1 | 5/2012 |
| WO | WO2014000498 A1 * | 1/2014 |

OTHER PUBLICATIONS

International Search Report dated Nov. 28, 2014 in corresponding International Application No. PCT/CN2014/073186.
International Search Report, dated Nov. 28, 2014, in International Application No. PCT/2014/073186 (4 pp.).
Chinese Office Action dated Jan. 3, 2019 in related Chinese Patent Application No. 201480000353.X (6 pages).

* cited by examiner

WIRELESS CONNECTION ESTABLISHMENT METHOD AND APPARATUS

CROSS-REFERENCE TO RELATED APPLICATIONS

This application is a continuation of International Application No. PCT/CN2014/073186, filed on Mar. 11, 2014, which is hereby incorporated by reference in its entirety.

TECHNICAL FIELD

Embodiments of the present invention relate to the field of communications technologies, and in particular, to a wireless connection establishment method and apparatus.

BACKGROUND

In a wireless communications network, an interface between user equipment (UE for short) and a base station belongs to an air interface, AI for short. A protocol stack of the air interface may include a logical channel, a transmission channel, and a physical channel. Logical channels occupied by a control plane (CP for short) and a user plane (UP for short) are different, that is, a signaling radio bearer (SRB for short) and a data radio bearer (DRB for short) are separated in the logical channel. However, a CP of the UE and a UP of the UE are multiplexed in a same transmission channel and a same physical channel, so as to implement data transmission of the CP and the UP.

However, in the prior art, because in a cell accessed by a UE, a CP and a UP of the UE are multiplexed in a same transmission channel and a same physical channel, if a configuration of the CP or the UP changes, the transmission channel and the physical channel also need to be reconfigured at the same time. Therefore, the CP and the UP of the UE may be interrupted at the same time, which reduces user experience.

SUMMARY

Embodiments of the present invention provide a wireless connection establishment method and apparatus, so as to avoid a problem of diminished user experience caused by possible simultaneous interruption of a CP connection and a UP connection when a configuration of the CP connection or the UP connection changes in a same cell accessed by a UE.

According to a first aspect, an embodiment of the present invention provides a base station, including: a CP establishment unit, configured to establish a CP connection to a UE according to a configuration parameter of the CP connection, where the configuration parameter of the CP connection is used to indicate a transmission channel occupied by the CP connection and a physical channel occupied by the CP connection; and a UP establishment unit, configured to establish a UP connection to the UE according to a configuration parameter of the UP connection, where the configuration parameter of the UP connection is used to indicate a transmission channel occupied by the UP connection and a physical channel occupied by the UP connection, where the transmission channel occupied by the CP connection is different from the transmission channel occupied by the UP connection, and the physical channel occupied by the CP connection is different from the physical channel occupied by the UP connection.

In a first possible implementation manner of the first aspect, the base station further includes: a sending unit, configured to send the configuration parameter of the CP connection and the configuration parameter of the UP connection to the UE before the CP establishment unit establishes the CP connection to the UE according to the configuration parameter of the CP connection, so that the CP establishment unit establishes the CP connection to the UE and the UP establishment unit establishes the UP connection to the UE.

In a second possible implementation manner of the first aspect, the base station further includes: a sending unit, configured to: before the UP establishment unit establishes the UP connection to the UE according to the configuration parameter of the UP connection, send the configuration parameter of the UP connection to the UE by using the CP connection established by the CP establishment unit, so that the UP establishment unit establishes the UP connection to the UE.

With reference to the first aspect or the first possible implementation manner of the first aspect or the second possible implementation manner of the first aspect, in a third possible implementation manner of the first aspect, a first cell to which the UE establishes the CP connection is different from a second cell to which the UE establishes the UP connection.

With reference to the third possible implementation manner of the first aspect, in a fourth possible implementation manner of the first aspect, a radio access technology RAT in which the first cell works is different from a RAT in which the second cell works.

With reference to any one of the first to fourth possible implementation manners of the first aspect, in a fifth possible implementation manner of the first aspect, the base station further includes:

a processing unit, configured to determine whether the UE needs to transmit service data in a target cell, where the sending unit is further configured to send a first establishment command to the UE by using the CP connection after the UP establishment unit establishes the UP connection to the UE according to the configuration parameter of the UP connection and when the processing unit determines that the UE needs to transmit the service data in the target cell, where the first establishment command includes a configuration parameter of a UP connection to be established between the UE and the target cell, the configuration parameter of the UP connection to be established between the UE and the target cell is used to indicate a transmission channel and a physical channel that are occupied by the UP connection to be established between the UE and the target cell, the transmission channel occupied by the UP connection to be established between the UE and the target cell is different from the transmission channel occupied by the CP connection, and the physical channel occupied by the UP connection to be established between the UE and the target cell is different from the physical channel occupied by the CP connection.

With reference to any one of the first to fourth possible implementation manners of the first aspect, in a sixth possible implementation manner of the first aspect, the base station further includes:

a processing unit, configured to determine whether the UE needs to transmit control data in a target cell, where the sending unit is further configured to send a second establishment command to the UE by using the CP connection after the CP establishment unit establishes the CP connection to the UE according to the configuration parameter of the CP connection and when the processing unit determines that the UE needs to transmit the control data in the target cell, where the second establishment command includes a configuration parameter of a CP connection to be established between the UE and the target cell, the configuration parameter of the CP connection to be established between the UE and the target cell is used to indicate a transmission channel and a physical channel that are occupied by the CP connection to be established between the UE and the target cell, the transmission channel occupied by the CP connection to be established between the UE and the target cell is different from the transmission channel occupied by the UP connection, and the physical channel occupied by the CP connection to be established between the UE and the target cell is different from the physical channel occupied by the UP connection.

According to a second aspect, an embodiment of the present invention provides a UE, including: a CP establishment unit, configured to establish a CP connection to a base station according to a configuration parameter of the CP connection, where the configuration parameter of the CP connection is used to indicate a transmission channel occupied by the CP connection and a physical channel occupied by the CP connection; and a UP establishment unit, configured to establish a UP connection to the base station according to a configuration parameter of the UP connection, where the configuration parameter of the UP connection is used to indicate a transmission channel occupied by the UP connection and a physical channel occupied by the CP connection, where the transmission channel occupied by the CP connection is different from the transmission channel occupied by the UP connection, and the physical channel occupied by the CP connection is different from the physical channel occupied by the UP connection.

In a first possible implementation manner of the second aspect, the UE further includes:

a receiving unit, configured to: before the CP establishment unit establishes the CP connection to the base station according to the configuration parameter of the CP connection, receive the configuration parameter of the CP connection and the configuration parameter of the UP connection that are sent by the base station.

In a second possible implementation manner of the second aspect, the UE further includes:

a receiving unit, configured to: before the UP establishment unit establishes the UP connection to the base station according to the configuration parameter of the UP connection, receive, by using the CP connection established by the CP establishment unit, the configuration parameter of the UP connection that is sent by the base station.

With reference to the second aspect or the first possible implementation manner of the second aspect or the second possible implementation manner of the second aspect, in a third possible implementation manner of the second aspect, a first cell to which the UE establishes the CP connection is different from a second cell to which the UE establishes the UP connection.

With reference to the third possible implementation manner of the second aspect, in a fourth possible implementation manner of the second aspect, a radio access technology RAT in which the first cell works is different from a RAT in which the second cell works.

With reference to any one of the first to fourth possible implementation manners of the second aspect, in a fifth possible implementation manner of the second aspect, the receiving unit is further configured to: after the UP establishment unit establishes the UP connection to the base station according to the configuration parameter of the UP connection, receive, by using the CP connection, a first establishment command sent by the base station, where the first establishment command includes a configuration parameter of a UP connection to be established between the UE and a target cell, and the configuration parameter of the UP connection to be established between the UE and the target cell is used to indicate a transmission channel and a physical channel that are occupied by the UP connection to be established between the UE and the target cell; and the CP establishment unit is further configured to establish a UP connection to the target cell according to the first establishment command received by the receiving unit, where the transmission channel occupied by the UP connection to be established between the UE and the target cell is different from the transmission channel occupied by the CP connection, and the physical channel occupied by the UP connection to be established between the UE and the target cell is different from the physical channel occupied by the CP connection.

With reference to any one of the first to fourth possible implementation manners of the second aspect, in a sixth possible implementation manner of the second aspect, the receiving unit is further configured to: after the CP establishment unit establishes the CP connection to the base station according to the configuration parameter of the CP connection, receive, by using the CP connection, a second establishment command sent by the base station, where the second establishment command includes a configuration parameter of a CP connection to be established between the UE and a target cell, and the configuration parameter of the CP connection to be established between the UE and the target cell is used to indicate a transmission channel and a physical channel that are occupied by the CP connection to be established between the UE and the target cell; and the CP establishment unit is further configured to establish a CP connection to the target cell according to the second establishment command received by the receiving unit, where the transmission channel occupied by the CP connection to be established between the UE and the target cell is different from the transmission channel occupied by the UP connection, and the physical channel occupied by the CP connection to be established between the UE and the target cell is different from the physical channel occupied by the UP connection.

According to a third aspect, an embodiment of the present invention provides a wireless connection establishment method, including: establishing, by a base station, a CP connection to a UE according to a configuration parameter of the CP connection, where the configuration parameter of the CP connection is used to indicate a transmission channel occupied by the CP connection and a physical channel occupied by the CP connection; and establishing, by the base station, a UP connection to the UE according to a configuration parameter of the UP connection, where the configuration parameter of the UP connection is used to indicate a transmission channel occupied by the UP connection and a physical channel occupied by the UP connection, where the transmission channel occupied by the CP connection is different from the transmission channel occupied by the UP connection, and the physical channel occupied by the CP connection is different from the physical channel occupied by the UP connection.

In a first possible implementation manner of the third aspect, before the establishing, by the base station, the CP connection to the UE according to a configuration parameter of the CP connection, the method further includes:

sending, by the base station, the configuration parameter of the CP connection and the configuration parameter of the UP connection to the UE, so that the base station establishes the CP connection and the UP connection to the UE.

In a second possible implementation manner of the third aspect, before the establishing, by the base station, the UP connection to the UE according to a configuration parameter of the UP connection, the method further includes:

sending, by the base station, the configuration parameter of the UP connection to the UE by using the CP connection, so that the base station establishes the UP connection to the UE.

With reference to the third aspect or the first possible implementation manner of the third aspect or the second possible implementation manner of the third aspect, in a third possible implementation manner of the third aspect, a first cell to which the UE establishes the CP connection is different from a second cell to which the UE establishes the UP connection.

With reference to the third possible implementation manner of the third aspect, in a fourth possible implementation manner of the third aspect, a radio access technology RAT in which the first cell works is different from a RAT in which the second cell works.

With reference to the third aspect or any one of the first to fourth possible implementation manners of the third aspect, in a fifth possible implementation manner of the third aspect, after the establishing, by the base station, the UP connection to the UE according to a configuration parameter of the UP connection, the method further includes:

when the base station determines that the UE needs to transmit service data in a target cell, sending, by the base station, a first establishment command to the UE by using the CP connection, where the first establishment command includes a configuration parameter of a UP connection to be established between the UE and the target cell, the configuration parameter of the UP connection to be established between the UE and the target cell is used to indicate a transmission channel and a physical channel that are occupied by the UP connection to be established between the UE and the target cell, the transmission channel occupied by the UP connection to be established between the UE and the target cell is different from the transmission channel occupied by the CP connection, and the physical channel occupied by the UP connection to be established between the UE and the target cell is different from the physical channel occupied by the CP connection.

With reference to the third aspect or any one of the first to fourth possible implementation manners of the third aspect, in a sixth possible implementation manner of the third aspect, after the establishing, by the base station, the CP connection to the UE according to a configuration parameter of the CP connection, the method further includes:

when the base station determines that the UE needs to transmit control data in a target cell, sending, by the base station, a second establishment command to the UE by using the CP connection, where the second establishment command includes a configuration parameter of a CP connection to be established between the UE and the target cell, the configuration parameter of the CP connection to be established between the UE and the target cell is used to indicate a transmission channel and a physical channel that are occupied by the CP connection to be established between the UE and the target cell, the transmission channel occupied by the CP connection to be established between the UE and the target cell is different from the transmission channel occupied by the UP connection, and the physical channel occupied by the CP connection to be established between the UE and the target cell is different from the physical channel occupied by the UP connection.

According to a fourth aspect, an embodiment of the present invention further provides a wireless connection establishment method, including: establishing, by a UE, a CP connection to a base station according to a configuration parameter of the CP connection, where the configuration parameter of the CP connection is used to indicate a transmission channel occupied by the CP connection and a physical channel occupied by the CP connection; and establishing, by the UE, a UP connection to the base station according to a configuration parameter of the UP connection, where the configuration parameter of the UP connection is used to indicate a transmission channel occupied by the UP connection and a physical channel occupied by the CP connection, where the transmission channel occupied by the CP connection is different from the transmission channel occupied by the UP connection, and the physical channel occupied by the CP connection is different from the physical channel occupied by the UP connection.

In a second possible implementation manner of the fourth aspect, before the establishing, by the UE, the CP connection to the base station according to a configuration parameter of the CP connection, the method further includes:

receiving, by the UE, the configuration parameter of the CP connection and the configuration parameter of the UP connection that are sent by the base station.

In a second possible implementation manner of the fourth aspect, before the establishing, by the UE, the UP connection to the base station according to a configuration parameter of the UP connection, the method further includes:

receiving, by the UE by using the CP connection, the configuration parameter of the UP connection that is sent by the base station.

With reference to the fourth aspect or the first possible implementation manner of the fourth aspect or the second possible implementation manner of the fourth aspect, in a third possible implementation manner of the fourth aspect, a first cell to which the UE establishes the CP connection is different from a second cell to which the UE establishes the UP connection.

With reference to the third possible implementation manner of the fourth aspect, in a fourth possible implementation manner of the fourth aspect, a radio access technology RAT in which the first cell works is different from a RAT in which the second cell works.

With reference to the fourth aspect or any one of the first to fourth possible implementation manners of the fourth aspect, in a fifth possible implementation manner of the fourth aspect, after the establishing, by the UE, the UP connection to the base station according to a configuration parameter of the UP connection, the method further includes:

receiving, by the UE by using the CP connection, a first establishment command sent by the base station, where the first establishment command includes a configuration parameter of a UP connection to be established between the UE and a target cell, the configuration parameter of the UP connection to be established between the UE and the target cell is used to indicate a transmission channel and a physical channel that are occupied by the UP connection to be established between the UE and the target cell; and establishing, by the UE, a UP connection to the target cell according to the first establishment command, where the transmission channel occupied by the UP connection to be established between the UE and the target cell is different from the transmission channel occupied by the CP connection, and the physical channel occupied by the UP connection to be established between the UE and the target cell is different from the physical channel occupied by the CP connection.

With reference to the fourth aspect or any one of the first to fourth possible implementation manners of the fourth aspect, in a sixth possible implementation manner of the fourth aspect, after the establishing, by a UE, a CP connection to a base station according to a configuration parameter of the CP connection, the method further includes:

receiving, by the UE by using the CP connection, a second establishment command sent by the base station, where the second establishment command includes a configuration parameter of a CP connection to be established between the UE and a target cell, the configuration parameter of the CP connection to be established between the UE and the target cell is used to indicate a transmission channel and a physical channel that are occupied by the CP connection to be established between the UE and the target cell; and establishing, by the UE, a CP connection to the target cell according to the second establishment command, where the transmission channel occupied by the CP connection to be established between the UE and the target cell is different from the transmission channel occupied by the UP connection, and the physical channel occupied by the CP connection to be established between the UE and the target cell is different from the physical channel occupied by the UP connection.

According to the wireless connection establishment method and apparatus provided in the embodiments of the present invention, when a base station establishes a wireless connection to a UE, a transmission channel occupied by a CP connection of the UE is different from a transmission channel occupied by a UP connection, and a physical channel occupied by the CP connection of the UE is also different from a physical channel occupied by the UP connection. Therefore, a CP connection and a UP connection of a UE are separated, and when the CP connection or the UP connection changes in a cell accessed by the UE, the CP connection and the UP connection are not interrupted at the same time, which ensures that no call drop occurs in a communication connection and improves user experience; and reduces a time delay, increases a network throughput, and further improves data transmission flexibility in an UP connection.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
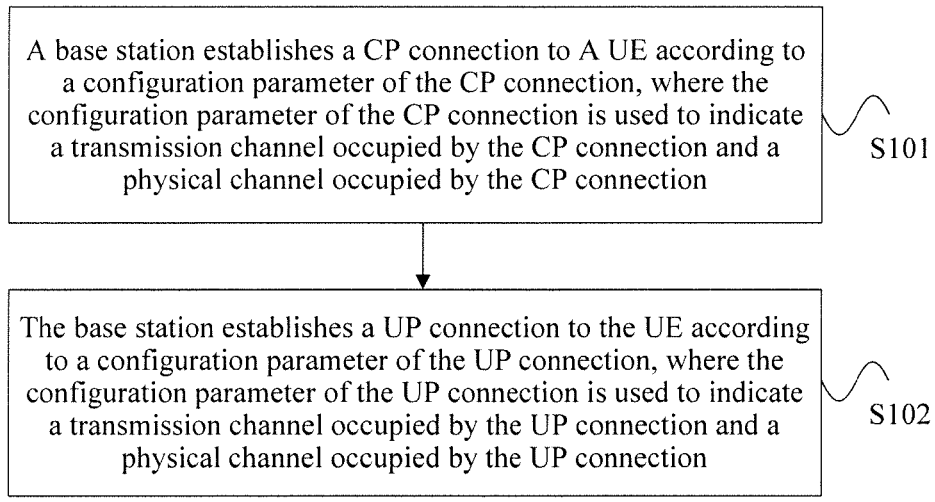
FIG. 1 is a flowchart of embodiment 1 of a wireless connection establishment method according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The technical solutions of the present invention may be applied to various wireless communications systems, for example, a Global System for Mobile Communications (GSM for short), a General Packet Radio Service (GPRS for short) system, a Code Division Multiple Access (CDMA for short) system, a CDMA2000 system, a Wideband Code Division Multiple Access (WCDMA for short) system, a Long Term Evolution (LTE for short) system, or a Worldwide Interoperability for Microwave Access (WiMAX for short) system.

A base station may be a base station controller (BSC for short) in the GSM system, the GPRS system, or the CDMA system, or may be an evolved NodeB (eNB for short) in the LTE system, or may be a network element such as an access service network base station (ASN BS for short) in the WiMAX system. A UE may be a device such as a mobile phone or a tablet computer.

A logical channel, a transmission channel, and a physical channel are described herein.

The logical channel provides a data transmission service for a wireless connection (that is, a CP connection and a UP connection, where the CP connection is a wireless connection for control data transmission, and the UP connection is a wireless connection for service data transmission). The logical channel may be divided into a control logical channel and a service logical channel, where the control logical channel is used to carry control data (that is, data over the CP connection), and the service logical channel is used to carry service data (that is, data over the UP connection).

The transmission channel is used to define a manner and a characteristic (for example, a transmission rate, an error rate, and a time delay) for transmitting data on an air interface. The physical channel defines a physical resource for transmitting data on an air interface, where the physical resource may specifically include a carrier, a scrambling code, a channelization code (optionally), a start and end time (duration), and the like.

The logical channel is used to define a type of data transmission. Therefore, data transmitted between the base station and the UE is first carried on a corresponding logical channel, and the data carried on the logical channel may be a data flow of independent blocks, or may be a mixed data flow with a definite start bit. A logical channel carrying data is mapped onto a transmission channel, that is, specific processing is performed on and indication information such as a transmission format is added to the data carried on the logical channel. Then, the transmission channel carrying the data is mapped onto a physical channel, that is, a carrier, a scrambling code, a spreading code, and a start and end time are determined for the data carried on the transmission channel according to a UE to which the data belongs and a function of the data to perform a related operation, and the data is finally modulated into an analog radio frequency signal for transmission.

Therefore, a logical channel occupied by the CP connection is generally different from a logical channel occupied by the UP connection, and a transmission channel occupied by the CP connection is generally the same as a transmission channel occupied by the UP connection. For example, transmission rates, error rates, and time delays of the transmission channels are the same. Generally, a physical channel occupied by the CP connection is also the same as a physical channel occupied by the UP connection. For example, carriers, scrambling codes, channelization codes (optionally), start and end times (duration), and the like of the physical channels are the same. A manner in which the CP connection and the UP connection occupy a transmission channel may be that data transmission of both the CP connection and the UP connection is multiplexed on the transmission channel in a scheduling manner; a manner in which the CP connection and the UP connection occupy a physical channel may be that data transmission of both the CP connection and the UP connection is multiplexed on the physical channel in a scheduling manner. Therefore, QoS requirements of the CP connection and the UP connection may be not satisfied at the same time, and user experience may be not ensured.

FIG. 1 is a flowchart of embodiment 1 of a wireless connection establishment method according to the present invention. As shown in FIG. 1, the method in this embodiment may include:

S101. A base station establishes a CP connection to a UE according to a configuration parameter of the CP connection, where the configuration parameter of the CP connection is used to indicate a transmission channel occupied by the CP connection and a physical channel occupied by the CP connection.

S102. The base station establishes a UP connection to the UE according to a configuration parameter of the UP connection, where the configuration parameter of the UP connection is used to indicate a transmission channel occupied by the UP connection and a physical channel occupied by the UP connection.

In this embodiment, the base station establishes the CP connection to the UE according to the configuration parameter of the CP connection, so that the CP connection of the UE is located in a cell controlled by the base station, that is, the UE establishes the CP connection to the cell controlled by the base station. The base station may also establish the UP connection to the UE according to the configuration parameter of the UP connection, so that the UP connection of the UE is located in a cell controlled by the base station, that is, the UE establishes the UP connection to the cell controlled by the base station. The CP connection and the UP connection may be both located in a same cell controlled by the base station, or may be separately located in different cells controlled by the base station. Regardless of whether the CP connection and the UP connection are located in the same cell or the different cells controlled by the base station, the transmission channel occupied by the CP connection is different from the transmission channel occupied by the UP connection. For example, at least one of transmission rates, error rates, and time delays of the CP connection and the UP connection are different. The physical channel occupied by the CP connection is different from the physical channel occupied by the UP connection. For example, at least one of timeslots and frequencies occupied by the CP connection and the UP connection are different. Because the transmission channels occupied by the UP connection and the CP connection of the UE are different, and the physical channels are also different, separation between the CP connection and the UP connection is implemented. Data of the CP connection and the UP connection is transmitted on their respective transmission channels and physical channels, which can satisfy their respective QoS requirements.

Therefore, when a configuration of the CP connection of the UE changes, only the transmission channel and the physical channel that are occupied by the CP connection need to be reconfigured, and the transmission channel and the physical channel that are occupied by the UP connection of the UE may not need to be reconfigured. When a configuration of the UP connection of the UE changes, only the transmission channel and the physical channel that are occupied by the UP connection may need to be reconfigured, and the transmission channel and the physical channel that are occupied by the CP connection do not need to be reconfigured. In this way, the CP connection and the UP connection do not affect each other, and no call drop in a communication connection is caused either between the UE and the base station, thereby reducing a time delay and increasing a network throughput. Moreover, because the CP connection and the UP connection have different QoS requirements, separation between the CP connection and the UP connection may ensure the QoS requirements of the CP connection and the UP connection in a more flexible manner, and the CP connection and the UP connection do not affect each other, which improves data transmission flexibility in the UP connection.

Figure 2:
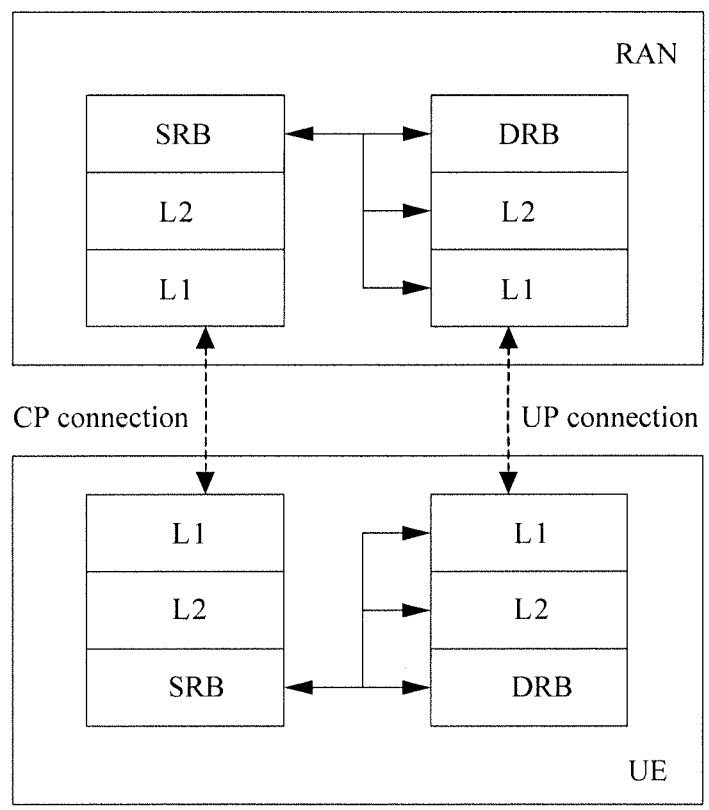
FIG. 2 is a first schematic diagram of a protocol stack of an air interface according to an embodiment of the present invention.

FIG. 2 is a first schematic diagram of a protocol stack of an air interface according to an embodiment of the present invention. As shown in FIG. 2, an SRB and a DRB are carried on different channels at Layer (L for short) 2 and L1. That is, the SRB and the DRB are separately carried on different transmission channels and physical channels, which indicates that a CP connection and a UP connection between a UE and a radio access network (RAN for short) (for example, a base station) are configured on different transmission channels and physical channels. The SRB carries data of the CP connection, where the data of the CP connection includes L3 signaling (including signaling related to the DRB) such as Radio Resource Control Protocol (RRC for short) signaling and NAS signaling, and the DRB carries data of the UP connection. The L2 refers to Packet Data Convergence Protocol (PDCP for short)/Radio Link Control (RLC for short)/MAC, and the L1 refers to a physical layer.

Optionally, a cell to which the UE establishes a UP connection and a cell to which the UE establishes a CP connection may be a same cell, or may be different cells controlled by a same base station.

Figure 3:
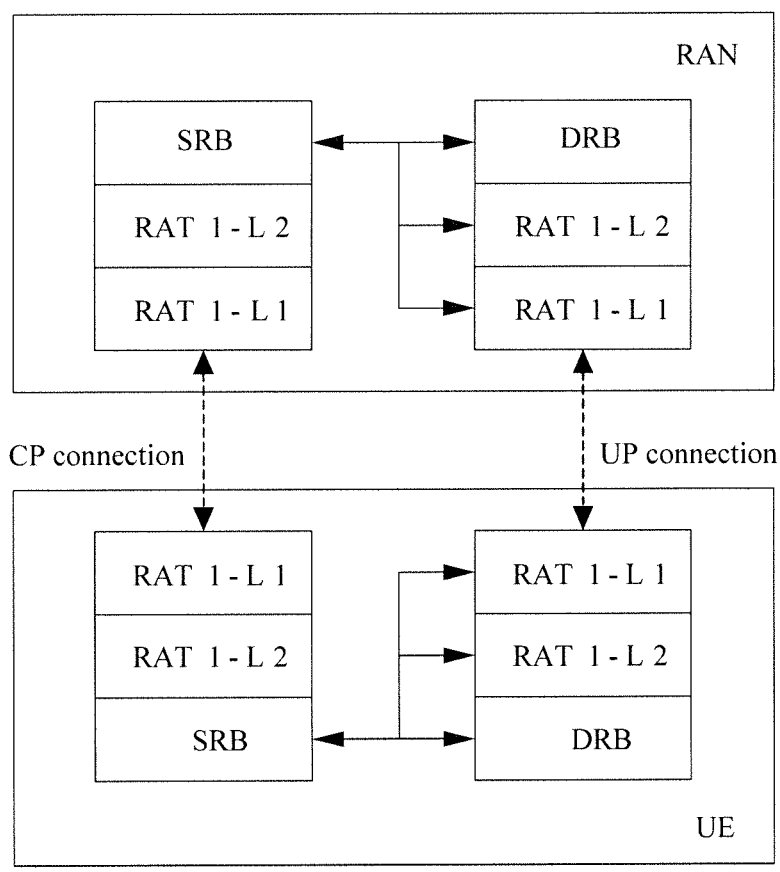
FIG. 3 is a second schematic diagram of a protocol stack of an air interface according to an embodiment of the present invention.

Optionally, the cell to which the UE establishes the CP connection is a first cell controlled by a base station, the cell to which the UE establishes the UP connection is a second cell controlled by the base station, where a radio access technology (Radio Access Technology, RAT for short) in which the first cell works is the same as a RAT in which the second cell works. That is, the UE establishes a UP connection and a CP connection separately to different cells in a same system, and likewise, the CP connection and the UP connection of the UE are separately configured on different transmission channels and physical channels. As shown in FIG. 3, the RATs in which the first cell and the second cell work are both a RAT1.

Figure 4:
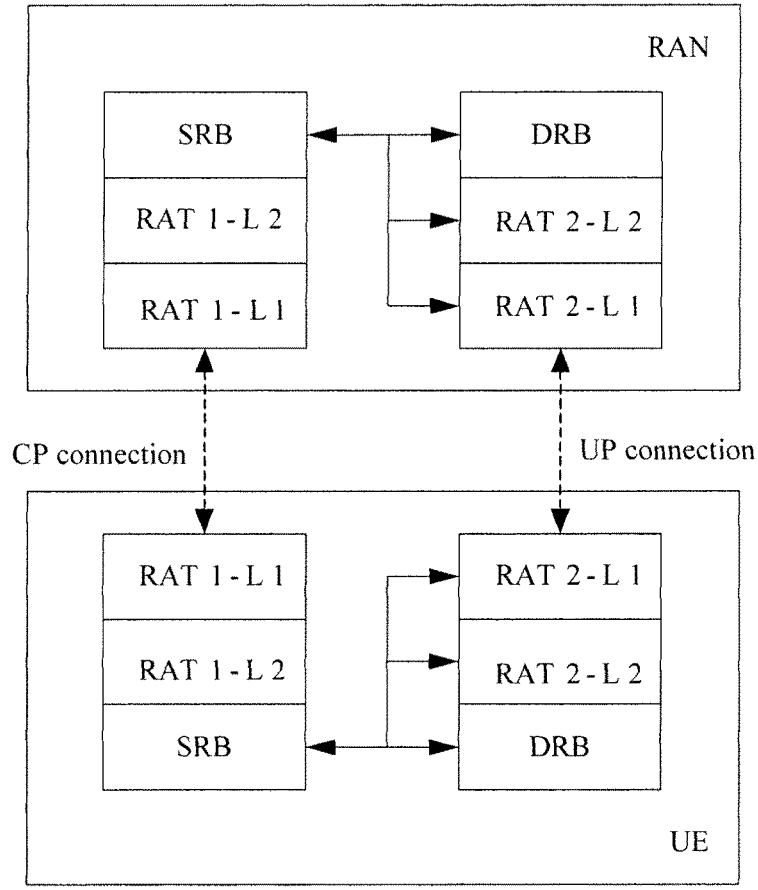
FIG. 4 is a third schematic diagram of a protocol stack of an air interface according to an embodiment of the present invention.

Optionally, the foregoing RAT in which the first cell works is different from the RAT in which the second cell works. That is, the UE establishes a UP connection and a CP connection separately to cells in different systems, and likewise, the CP connection and the UP connection of the UE are separately configured on different transmission channels and physical channels. As shown in FIG. 4, the RAT in which the first cell works is a RAT1, and the RAT in which the second cell works is a RAT2.

According to the wireless connection establishment method provided in this embodiment of the present invention, when a base station establishes a wireless connection to a UE, a transmission channel occupied by a CP connection of the UE is different from a transmission channel occupied by a UP connection, and a physical channel occupied by the CP connection of the UE is also different from a physical channel occupied by the UP connection. Therefore, separation between a CP connection and a UP connection of a UE is implemented, and when the CP connection or the UP connection changes in a cell accessed by the UE, the CP connection and the UP connection are not interrupted at the same time, which ensures that no call drop occurs in a communication connection and improves user experience; and reduces a time delay, increases a network throughput, and further improves data transmission flexibility in an UP connection.

Figure 5:
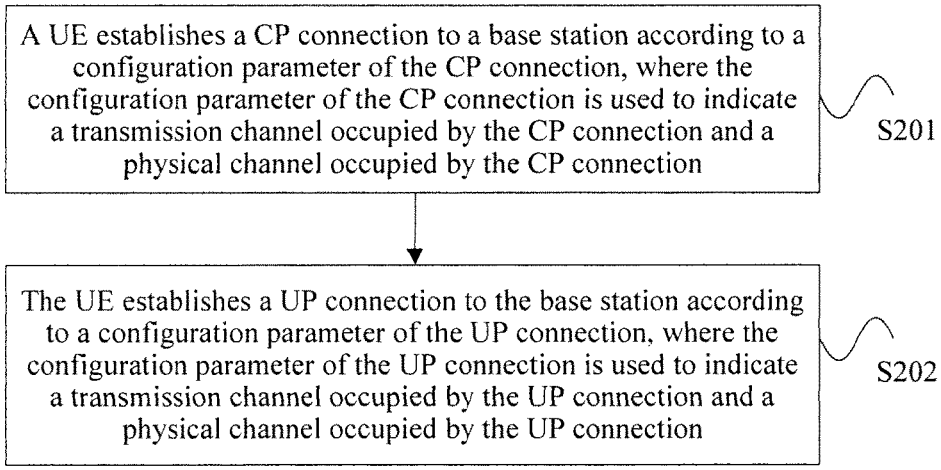
FIG. 5 is a flowchart of embodiment 2 of a wireless connection establishment method according to the present invention.

FIG. 5 is a flowchart of embodiment 2 of a wireless connection establishment method according to the present invention. As shown in FIG. 5, the method in this embodiment may include:

S201. A UE establishes a CP connection to a base station according to a configuration parameter of the CP connection, where the configuration parameter of the CP connection is used to indicate a transmission channel occupied by the CP connection and a physical channel occupied by the CP connection.

S202. The UE establishes a UP connection to the base station according to a configuration parameter of the UP connection, where the configuration parameter of the UP connection is used to indicate a transmission channel occupied by the UP connection and a physical channel occupied by the CP connection.

In this embodiment, the UE establishes the CP connection to the base station according to the configuration parameter of the CP connection, so that the CP connection of the UE is located in a cell controlled by the base station, that is, the UE establishes the CP connection to the cell controlled by the base station. The UE may also establish the UP connection to the base station according to the configuration parameter of the UP connection, so that the UP connection of the UE is located in a cell controlled by the base station, that is, the UE establishes the UP connection to the cell controlled by the base station. The CP connection and the UP connection may be located in a same cell controlled by the base station, or may be located in different cells controlled by the base station. Regardless of whether the CP connection and the UP connection are located in the same cell or the different cells controlled by the base station, the transmission channel occupied by the CP connection is different from the transmission channel occupied by the UP connection, and the physical channel occupied by the CP connection is different from the physical channel occupied by the UP connection. Because the transmission channels occupied by the UP connection and the CP connection of the UE are different, and the physical channels are also different, separation between the CP connection and the UP connection of the UE is implemented in both the transmission channel and the physical channel, thereby implementing separation between a CP connection and a UP connection of a same UE.

Therefore, when a configuration of the CP connection of the UE changes, only the transmission channel and the physical channel that are occupied by the CP connection need to be reconfigured, and the transmission channel and the physical channel that are occupied by the UP connection of the UE do not need to be reconfigured. When a configuration of the UP connection of the UE changes, only the transmission channel and the physical channel that are occupied by the UP connection need to be reconfigured, and the transmission channel and the physical channel that are occupied by the CP connection do not need to be reconfigured. In this way, the CP connection and the UP connection do not affect each other, and no call drop in a communication connection is caused either between the UE and the base station, thereby reducing a time delay and increasing a network throughput. Moreover, because the CP connection and the UP connection have different QoS requirements, separation between the CP connection and the UP connection may ensure the QoS requirements of the CP connection and the UP connection in a more flexible manner, and the CP connection and the UP connection do not affect each other, which improves data transmission flexibility in the UP connection.

Optionally, a cell to which the UE establishes a UP connection and a cell to which the UE establishes a CP connection may be a same cell.

Optionally, the cell to which the UE establishes the CP connection is a first cell controlled by a base station, the cell to which the UE establishes the UP connection is a second cell controlled by the base station, where a RAT in which the first cell works is the same as a RAT in which the second cell works. That is, the UE establishes a UP connection and a CP connection separately to different cells in a same system, and likewise, the CP connection and the UP connection of the UE are separately configured on different transmission channels and physical channels. As shown in FIG. 3, the RATs in which the first cell and the second cell work are both a RAT1.

Optionally, the foregoing RAT in which the first cell works is different from the RAT in which the second cell works. That is, the UE establishes a UP connection and a CP connection separately to cells in different systems, and likewise, the CP connection and the UP connection of the UE are separately configured on different transmission channels and physical channels. As shown in FIG. 4, the RAT in which the first cell works is a RAT1, and the RAT in which the second cell works is a RAT2.

According to the wireless connection establishment method provided in this embodiment of the present invention, when a UE establishes a wireless connection to a base station, a transmission channel occupied by a CP connection of the UE is different from a transmission channel occupied by a UP connection, and a physical channel occupied by the CP connection of the UE is also different from a physical channel occupied by the UP connection. Therefore, separation between a CP connection and a UP connection of a UE is implemented, and when the CP connection or the UP connection changes in a cell accessed by the UE, the CP connection and the UP connection are not interrupted at the same time, which ensures that no call drop occurs in a communication connection and improves user experience; and reduces a time delay, increases a network throughput, and further improves data transmission flexibility in an UP connection.

Figure 6:
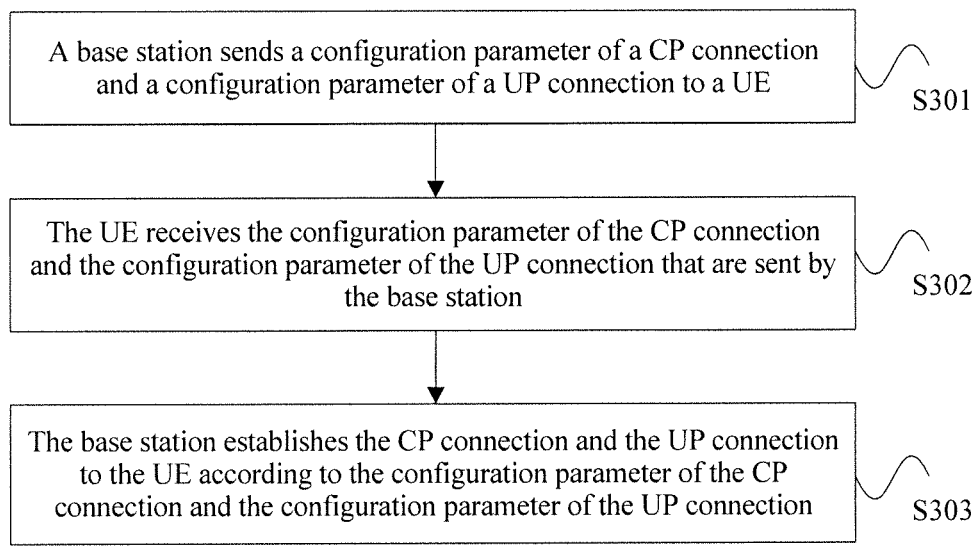
FIG. 6 is a flowchart of embodiment 3 of a wireless connection establishment method according to the present invention.

FIG. 6 is a flowchart of embodiment 3 of a wireless connection establishment method according to the present invention. As shown in FIG. 6, the method in this embodiment includes:

S301. A base station sends a configuration parameter of a CP connection and a configuration parameter of a UP connection to a UE.

S302. The UE receives the configuration parameter of the CP connection and the configuration parameter of the UP connection that are sent by the base station.

S303. The base station establishes the CP connection and the UP connection to the UE according to the configuration parameter of the CP connection and the configuration parameter of the UP connection.

In this embodiment, the base station may determine the configuration parameter of the CP connection of the UE in a random access procedure of the UE, so as to establish the CP connection. In addition, when the UE needs to perform a service, the UE and a core network device perform a service negotiation process. After the service negotiation process is completed, the core network device instructs the base station to establish the UP connection of the UE, and then the base station determines the configuration parameter of the UP connection. For example, the core network device sends radio access bearer indication information to the base station, where the radio access bearer indication information may include service QoS information such as a rate, a time delay, and an error rate for establishing a radio access bearer of the UE. The base station determines the configuration parameter of the UP connection of the UE according to the radio access bearer indication information sent by the core network device, a difference between a transmission channel occupied by the CP connection and a transmission channel occupied by the UP connection, and a difference between a physical channel occupied by the CP connection and a physical channel occupied by the UP connection, so as to establish the UP connection. Therefore, in this embodiment, the configuration parameter of the CP connection that is determined by the base station is used to indicate the transmission channel and the physical channel that are occupied by the CP connection, and further, the configuration parameter of the CP connection is used to indicate a logical channel occupied by the CP connection. The configuration parameter of the UP connection determined by the base station is used to indicate the transmission channel and the physical channel that are occupied by the UP connection, and further, the configuration parameter of the UP connection is used to indicate a logical channel occupied by the UP connection. It should be noted that the logical channel occupied by the CP connection is different from the logical channel occupied by the UP connection, the transmission channel occupied by the CP connection is different from the transmission channel occupied by the UP connection, and the physical channel occupied by the CP connection is different from the physical channel occupied by the UP connection. Because the base station separately configures the CP connection and the UP connection of the UE on different transmission channels and physical channels, separation between the CP connection and the UP connection of the UE is implemented.

Optionally, if the base station determines that the UP connection and the CP connection are located in a same cell (for example, a first cell), the first cell controlled by the base station determines the configuration parameter of the CP connection and the configuration parameter of the UP connection of the UE. In this way, the CP connection and the UP connection that are established by the UE are located in a same cell.

Optionally, if the base station determines that the UP connection and the CP connection are located in different cells, for example, the CP connection is located in a first cell controlled by the base station, and the UP connection is located in a second cell controlled by the base station, after the first cell determines the configuration parameter of the CP connection of the UE, the first cell determines that the UP connection needs to be located in the second cell controlled by the base station, the first cell sends a UP connection establishment request of the UE to the second cell. The second cell determines the configuration parameter of the UP connection of the UE according to the UP connection establishment request of the UE that is sent by the first cell. For example, the first cell sends, to the second cell, radio access bearer indication information received from the core network device, where the radio access bearer indication information may include QoS information such as a rate, a time delay, and an error rate for establishing a DRB bearer of the UE. Then, the second cell determines the configuration parameter of the UP connection of the UE according to the radio access bearer indication information, the second cell then includes the configuration parameter of the UP connection of the UE in a UP connection establishment response of the UE and sends the UP connection establishment response to the first cell, and the first cell then acquires the configuration parameter of the UP connection of the UE from the UP connection establishment response of the UE. In this way, the CP connection established by the UE is located in the first cell, and the UP connection established by the UE is located in the second cell.

In this embodiment, after the base station determines the configuration parameter of the CP connection and the configuration parameter of the UP connection of the UE, the base station may generate a radio resource configuration message according to the configuration parameter of the CP connection and the configuration parameter of the UP contion and the configuration parameter of the UP connection of the UE is shown in the following. mac-MainConfig for SRB is a transmission channel parameter for configuring the CP connection, mac-MainConfig for DRB is a transmission channel parameter for configuring the UP connection, PhysicalconfigDedicated for SRB is a physical channel parameter for configuring the CP connection, and PhysicalconfigDedicated for DRB is a physical channel parameter for configuring the UP connection. Another part is consistent with the prior art, and details are not described herein.

```
-- ASN1START
RadioResourceConfigDedicated :: =      SEQUENCE {
    srb-ToAddModList    SRB-ToAddModList         OPTIONAL, -- Cond
HO-Conn
    drb-ToAddModList    DRB-ToAddModList         OPTIONAL,-- Cond
HO-
toEUTRA
    drb-ToReleaseList  DRB-ToReleaseList         OPTIONAL, -- Need ON
    mac-MainConfig for SRB             CHOICE {
    explicitValue    MAC-MainConfig,
    defaultValue     NULL
    }       OPTIONAL,        -- Cond HO-
toEUTRA2
    mac-MainConfig for DRB              CHOICE {
    explicitValue                 MAC-MainConfig,
    defaultValue                  NULL
    }           OPTIONAL,   -- Cond HO-
toEUTRA2
    sps-Config    SPS-Config                 OPTIONAL, -- Need ON
    physicalConfigDedicated            for SRB  PhysicalConfigDedicated
    OPTIONAL,                           -- Need ON
    physicalConfigDedicated for DRB          PhysicalConfigDedicated
    OPTIONAL,                -- Need ON
    ...,
    [[         rlf-TimersAndConstants-r9   RLF-TimersAndConstants-r9
OPTIONAL    -- Need ON
    ]]
    }
``` nection of the UE, where the radio resource configuration message includes the configuration parameter of the CP connection and the configuration parameter of the UP connection. Then, the base station sends the radio resource configuration message to the UE by using a public connection, so that after receiving the radio resource configuration message, the UE acquires the configuration parameter of the CP connection and the configuration parameter of the UP connection that are in the radio resource configuration message. Then, the UE establishes the CP connection and the UP connection to the base station according to the configuration parameter of the CP connection and the configuration parameter of the UP connection, and the base station also establishes the CP connection and the UP connection to the UE according to the configuration parameter of the CP connection and the configuration parameter of the UP connection that are sent to the UE. In this way, the CP connection and the UP connection that are established by the UE are occupied on different transmission channels, and the CP connection and the UP connection that are established by the UE are occupied on different physical channels. Therefore, separation between the CP connection and the UP connection of the UE is implemented.

The following exemplarily describes the configuration parameter of the CP connection and the configuration parameter of the UP connection of the UE. An information element that is in the radio resource configuration message and indicates the configuration parameter of the CP connec- According to the wireless connection establishment method provided in this embodiment, when a base station establishes a wireless connection to a UE, a transmission channel occupied by a CP connection of the UE is different from a transmission channel occupied by a UP connection, and a physical channel occupied by the CP connection of the UE is also different from a physical channel occupied by the UP connection. Therefore, separation between a CP connection and a UP connection of a UE is implemented, and when the CP connection or the UP connection changes in a cell accessed by the UE, the CP connection and the UP connection are not interrupted at the same time, which ensures that no call drop occurs in a communication connection and improves user experience; and reduces a time delay, increases a network throughput, and further improves data transmission flexibility in an UP connection.

Figure 7:
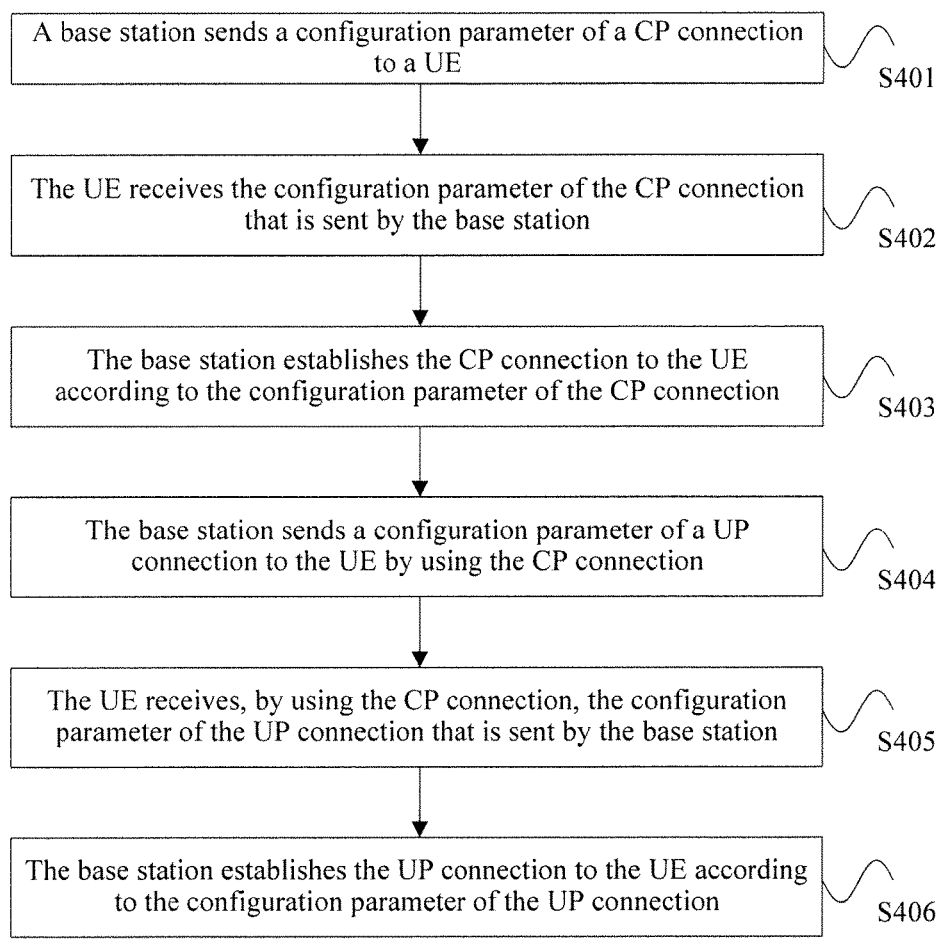
FIG. 7 is a flowchart of embodiment 4 of a wireless connection establishment method according to the present invention.

FIG. 7 is a flowchart of embodiment 4 of a wireless connection establishment method according to the present invention. As shown in FIG. 7, the method in this embodiment includes:

S401. A base station sends a configuration parameter of a CP connection to a UE.

S402. The UE receives the configuration parameter of the CP connection that is sent by the base station.

S403. The base station establishes the CP connection to the UE according to the configuration parameter of the CP connection.

In this embodiment, the UE may establish the CP connection of the UE by using a random access procedure, and the base station determines the configuration parameter of the CP connection of the UE by using the random access procedure of the UE, where the configuration parameter of the CP connection is used to indicate a transmission channel and a physical channel that are occupied by the CP connection, and further, may indicate a logical channel occupied by the CP connection. Then, the base station may send the determined configuration parameter of the CP connection to the UE by using a radio resource configuration message, and the UE may establish the CP connection to the base station according to the configuration parameter of the CP connection.

S404. The base station sends a configuration parameter of a UP connection to the UE by using the CP connection.

S405. The UE receives, by using the CP connection, the configuration parameter of the UP connection that is sent by the base station.

S406. The base station establishes the UP connection to the UE according to the configuration parameter of the UP connection.

When the UE needs to perform a service, the UE and a core network device perform a service negotiation process, and after the service negotiation process is completed, the core network device instructs the base station to establish the UP connection of the UE, and then the base station determines the configuration parameter for establishing the UP connection. For example, the core network device sends radio access bearer indication information to the base station, where the radio access bearer indication information may include service QoS information such as a rate, a time delay, and an error rate for establishing a DRB bearer of the UE. The base station determines the configuration parameter of the UP connection of the UE according to the radio access bearer indication information sent by the core network device, a difference between a transmission channel occupied by the CP connection and a transmission channel occupied by the UP connection, and a difference between a physical channel occupied by the CP connection and a physical channel occupied by the UP connection, so as to establish the UP connection. In this embodiment, the configuration parameter of the UP connection of the UE that is determined by the base station is used to indicate the transmission channel and the physical channel that are occupied by the UP connection, and further, may further indicate a logical channel occupied by the UP connection. The base station may include the configuration parameter of the UP connection in another radio resource configuration message and sends the another radio resource configuration message to the UE by using the established CP connection, and correspondingly, the UE may receive, by using the CP connection of the UE, the configuration parameter of the UP connection that is sent by the base station. Then, the base station may establish the UP connection to the UE according to the configuration parameter of the UP connection.

It should be noted that the CP connection and the UP connection may be located in a same cell or different cells controlled by the base station. Specifically, for how the base station determines the configuration parameter of the UP connection, refer to a related record in the foregoing method embodiment 3 of the present invention, and details are not described herein.

According to the wireless connection establishment method provided in this embodiment, when a base station establishes a wireless connection to a UE, a transmission channel occupied by a CP connection of the UE is different from a transmission channel occupied by a UP connection, and a physical channel occupied by the CP connection of the UE is also different from a physical channel occupied by the UP connection. Therefore, separation between a CP connection and a UP connection of a UE is implemented, and when the CP connection or the UP connection changes in a cell accessed by the UE, the CP connection and the UP connection are not interrupted at the same time, which ensures that no call drop occurs in a communication connection and improves user experience; and reduces a time delay, increases a network throughput, and further improves data transmission flexibility in an UP connection.

Figure 8:
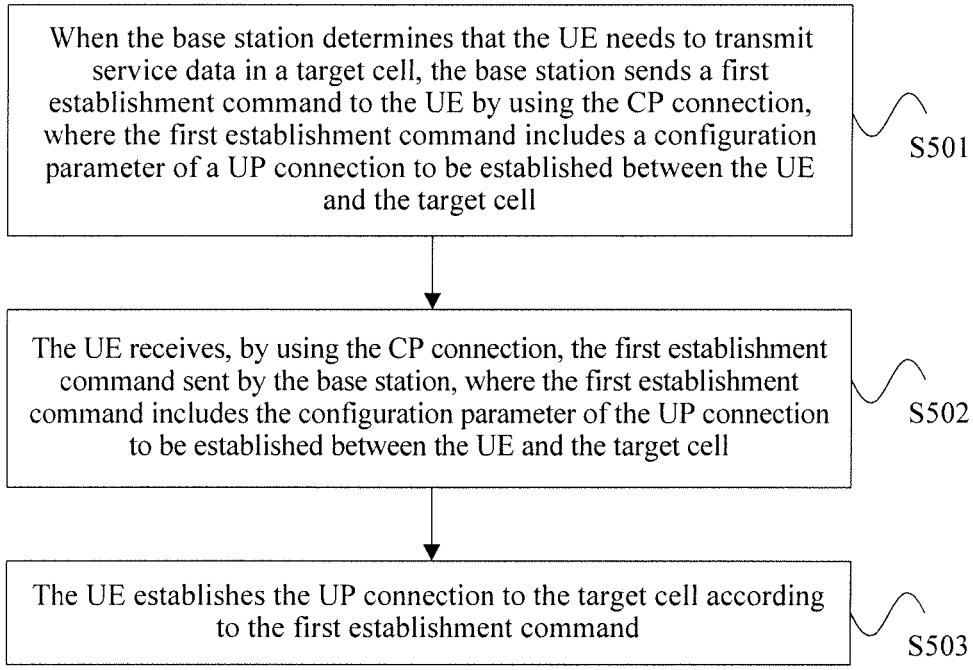
FIG. 8 is a flowchart of embodiment 5 of a wireless connection establishment method according to the present invention.

FIG. 8 is a flowchart of embodiment 5 of a wireless connection establishment method according to the present invention. As shown in FIG. 8, in this embodiment that is based on any one of method embodiments 1 to 4 of the present invention, further, after the base station establishes the UP connection to the UE according to the configuration parameter of the UP connection, the method in this embodiment may further include:

S501. When the base station determines that the UE needs to transmit service data in a target cell, the base station sends a first establishment command to the UE by using the CP connection, where the first establishment command includes a configuration parameter of a UP connection to be established between the UE and the target cell.

In this embodiment, because transmission channels occupied by the UP connection and the CP connection of the UE are different, and physical channels are also different, the base station may independently re-establish, in a cell, the UP connection of the UE. A specific process is as follows:

When the base station determines that the UE needs to transmit the service data in the target cell, that is, determines that the UE needs to establish the UP connection to the target cell, the base station acquires the configuration parameter of the UP connection to be established between the UE and the target cell, where the configuration parameter of the UP connection to be established between the UE and the target cell is used to indicate a transmission channel and a physical channel that are occupied by the UP connection to be established between the UE and the target cell, and further indicates a logical channel occupied by the UP connection to be established between the UE and the target cell. In addition, the transmission channel occupied by the UP connection to be established between the UE and the target cell is different from the transmission channel occupied by the CP connection, and the physical channel occupied by the UP connection to be established between the UE and the target cell is different from the physical channel occupied by the CP connection. If the target cell is a cell controlled by the base station, the base station may determine the configuration parameter of the UP connection to be established between the UE and the target cell. If the target cell is a cell controlled by another base station, the base station requests the base station that controls the target cell to acquire the configuration parameter of the UP connection to be established between the UE and the target cell. Then, the base station includes, in the first establishment command, the configuration parameter of the UP connection to be established between the UE and the target cell and sends the first establishment command to the UE by using the CP connection.

S502. The UE receives, by using the CP connection, the first establishment command sent by the base station, where the first establishment command includes the configuration parameter of the UP connection to be established between the UE and the target cell.

S503. The UE establishes the UP connection to the target cell according to the first establishment command.

In this embodiment, the UE receives, by using the CP connection established to the base station, the first establishment command sent by the base station. The UE acquires, from the first establishment command, the configuration parameter of the UP connection to be established between the UE and the target cell, and then the UE establishes the UP connection to the target cell according to the configuration parameter of the UP connection to be established between the UE and the target cell. If the target cell is a cell controlled by the base station, the UE establishes a new UP connection to the base station according to the configuration parameter of the UP connection to be established between the UE and the target cell. If the target cell is a cell controlled by another base station, the UE establishes a new UP connection to the another base station according to the configuration parameter of the UP connection to be established between the UE and the target cell.

After the base station determines the UP connection to be established between the UE and the target cell, the base station may release a resource occupied by the UP connection in a source cell, where the source cell is a cell in which the UP connection of the UE is located before the UE establishes the UP connection to the target cell.

According to the wireless connection establishment method provided in this embodiment of the present invention, when the base station determines that the UE needs to transmit service data in a target cell, the base station sends a first establishment command to the UE by using the CP connection, where the first establishment command includes a configuration parameter of a UP connection to be established between the UE and the target cell. The UE establishes the UP connection to the target cell according to the first establishment command. In this way, it may be implemented that the UP connection of the UE may be independently re-established.

Figure 9:
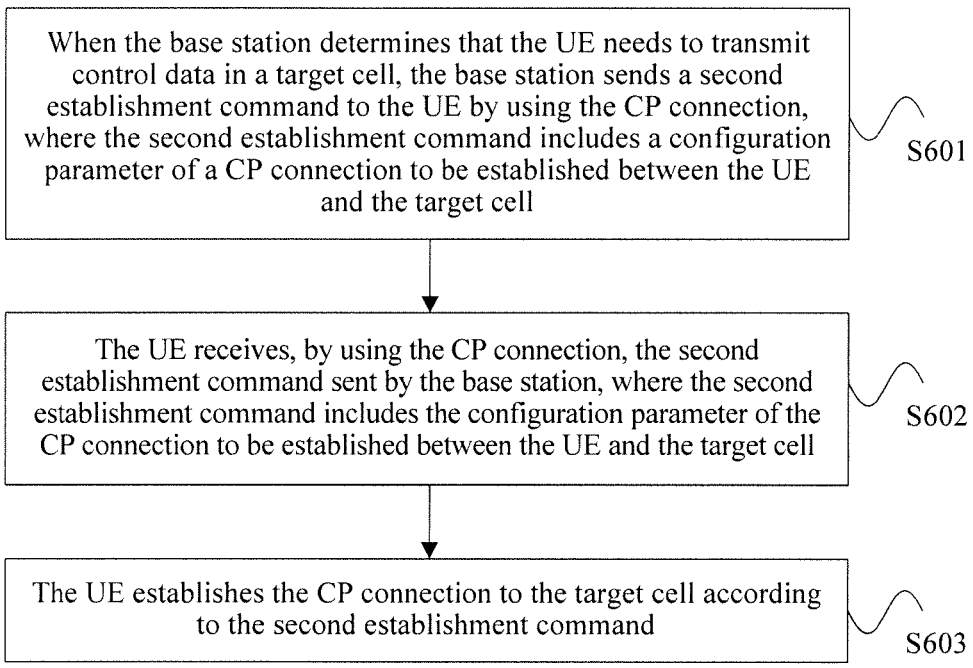
FIG. 9 is a flowchart of embodiment 6 of a wireless connection establishment method according to the present invention.

FIG. 9 is a flowchart of embodiment 6 of a wireless connection establishment method according to the present invention. As shown in FIG. 9, in this embodiment that is based on any one of method embodiments 1 to 4 of the present invention, further, after the base station establishes the CP connection to the UE according to the configuration parameter of the CP connection, the method in this embodiment may further include:

S601. When the base station determines that the UE needs to transmit control data in a target cell, the base station sends a second establishment command to the UE by using the CP connection, where the second establishment command includes a configuration parameter of a CP connection to be established between the UE and the target cell.

In this embodiment, because transmission channels occupied by the UP connection and the CP connection of the UE are different, and physical channels are also different, the base station may independently re-establish, in a cell, the CP connection of the UE. A specific process is as follows:

When the base station determines that the UE needs to transmit the control data in the target cell, that is, determines that the UE needs to establish the CP connection to the target cell, the base station acquires the configuration parameter of the CP connection to be established between the UE and the target cell, where the configuration parameter of the CP connection to be established between the UE and the target cell is used to indicate a transmission channel and a physical channel that are occupied by the CP connection to be established between the UE and the target cell, and further indicates a logical channel occupied by the CP connection to be established between the UE and the target cell. In addition, the transmission channel occupied by the CP connection to be established between the UE and the target cell is different from the transmission channel occupied by the UP connection, and the physical channel occupied by the CP connection to be established between the UE and the target cell is different from the physical channel occupied by the UP connection. If the target cell is a cell controlled by the base station, the base station may determine the configuration parameter of the CP connection to be established between the UE and the target cell. If the target cell is a cell controlled by another base station, the base station requests the base station that controls the target cell to acquire the configuration parameter of the CP connection to be established between the UE and the target cell. Then, the base station includes, in a second establishment command, the configuration parameter of the CP connection to be established between the UE and the target cell and sends the second establishment command to the UE by using the CP connection already established by the UE.

S602. The UE receives, by using the CP connection, the second establishment command sent by the base station, where the second establishment command includes the configuration parameter of the CP connection to be established between the UE and the target cell.

S603. The UE establishes the CP connection to the target cell according to the second establishment command.

In this embodiment, the UE receives, by using the CP connection established to the base station, the second establishment command sent by the base station. The UE acquires, from the second establishment command, the configuration parameter of the CP connection to be established between the UE and the target cell, and then the UE establishes the CP connection to the target cell according to the configuration parameter of the CP connection to be established between the UE and the target cell. If the target cell is a cell controlled by the base station, the UE establishes a new CP connection to the base station according to the configuration parameter of the CP connection to be established between the UE and the target cell. If the target cell is a cell controlled by another base station, the UE establishes a new CP connection to the another base station according to the configuration parameter of the CP connection to be established between the UE and the target cell.

After the base station determines the CP connection to be established between the UE and the target cell, the base station may release a resource occupied by the CP connection in a source cell, where the source cell is a cell in which the CP connection of the UE is located before the UE establishes the CP connection to the target cell.

According to the wireless connection establishment method provided in this embodiment of the present invention, when the base station determines that the UE needs to transmit control data in a target cell, the base station sends a second establishment command to the UE by using the CP connection, where the second establishment command includes a configuration parameter of a CP connection to be established between the UE and the target cell. The UE establishes the CP connection to the target cell according to the second establishment command. In this way, it may be implemented that the CP connection of the UE may be independently re-established.

Figure 10:
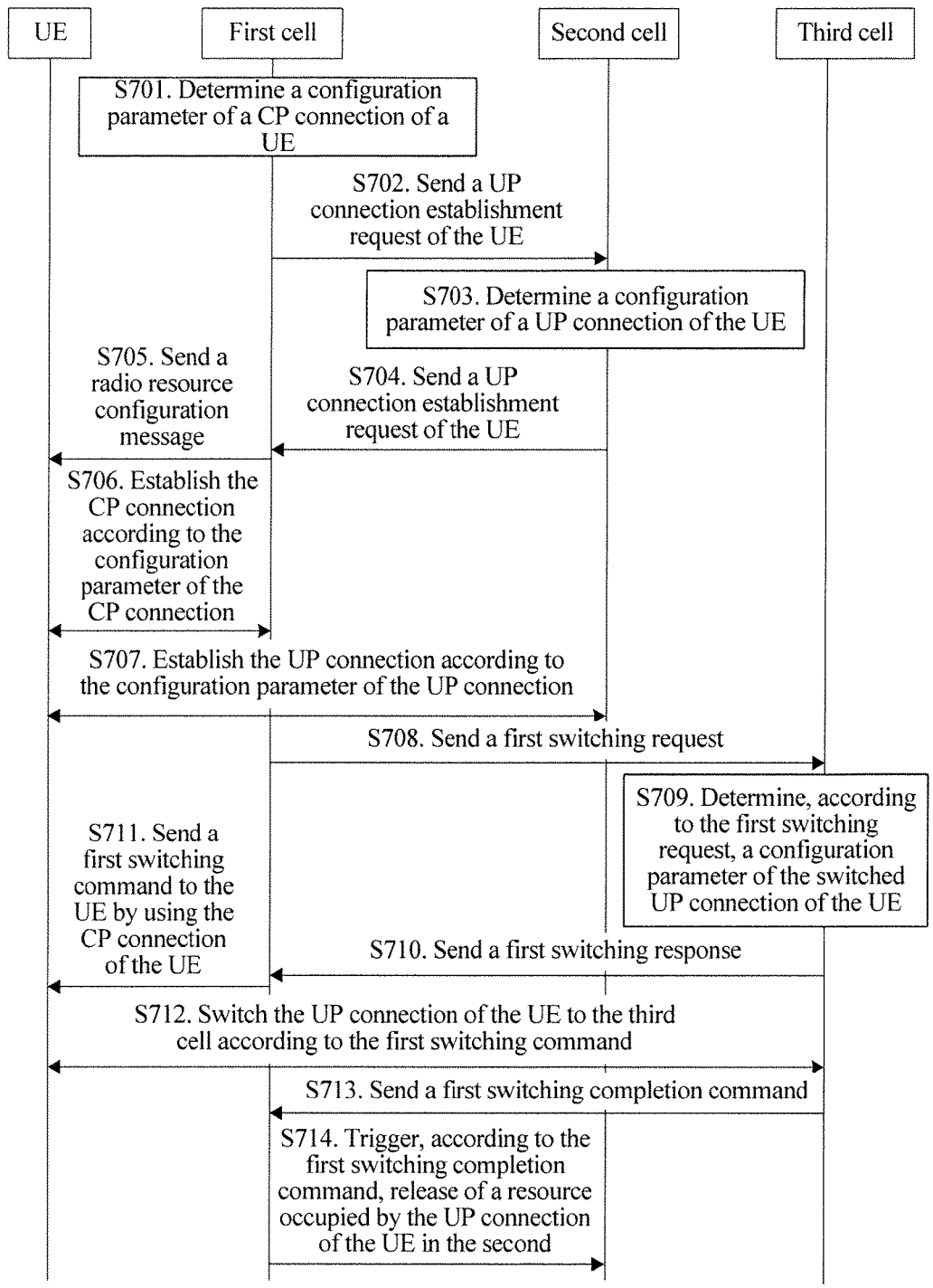
FIG. 10 is a flowchart of embodiment 7 of a wireless connection establishment method according to the present invention.

FIG. 10 is a flowchart of embodiment 7 of a wireless connection establishment method according to the present invention. As shown in FIG. 10, the method in this embodiment is described by using an example in which a UP connection and a CP connection of a UE are established in different cells. A first cell indicates that an execution body is a base station controlling the first cell, a second cell indicates that an execution body is a base station controlling the second cell, and a third cell indicates that an execution body is a base station controlling the third cell. The method in this embodiment may include:

S701. Determine a configuration parameter of the CP connection of the UE.

S702. Send a UP connection establishment request of the UE.

S703. Determine a configuration parameter of the UP connection of the UE.

S704. Send a UP connection establishment response of the UE.

In this embodiment, the first cell determines the configuration parameter of the CP connection of the UE in a random access procedure of the UE, and after the UE and a core network device complete a service negotiation process, if the first cell determines that the UP connection needs to be established in the second cell, the first cell may send the UP connection establishment request of the UE to the second cell, so as to request the second cell to allocate a resource to the UE. After receiving the UP connection establishment request of the UE that is sent by the first cell, the second cell determines the configuration parameter of the UP connection of the UE, and then generates the UP connection establishment response of the UE according to the configuration parameter of the UP connection of the UE. The UP connection establishment response of the UE includes the configuration parameter of the UP connection of the UE. A base station serving the first cell is the same as a base station serving the second cell; or, a base station serving the first cell is different from a base station serving the second cell.

S705. Send a radio resource configuration message.

In this embodiment, the first cell receives the UP connection establishment response of the UE that is sent by the second cell, acquires the configuration parameter of the UP connection of the UE from the UP connection establishment response of the UE, includes the configuration parameter of the CP connection and the configuration parameter of the UP connection in the radio resource configuration message, and sends the radio resource configuration message to the UE. The configuration parameter of the CP connection is used to indicate a transmission channel and a physical channel that are occupied by the CP connection, and the configuration parameter of the UP connection is used to indicate a transmission channel and a physical channel that are occupied by the UP connection. The transmission channel occupied by the CP connection is different from the transmission channel occupied by the UP connection, and the physical channel occupied by the CP connection is different from the physical channel occupied by the UP connection.

S706. Establish the CP connection according to the configuration parameter of the CP connection.

S707. Establish the UP connection according to the configuration parameter of the UP connection.

In this embodiment, the UE may establish a CP connection to the first cell according to the configuration parameter of the CP connection that is in the radio resource configuration message, and the UE may also establish a UP connection according to the configuration parameter of the UP connection that is in the radio resource configuration message. A transmission channel occupied by the established CP connection is different from a transmission channel occupied by the established UP connection, and a physical channel occupied by the established CP connection is different from a physical channel occupied by the established UP connection, thereby implementing separation between the CP connection and the UP connection of the UE.

In this embodiment, after separation between the CP connection and the UP connection of the UE is implemented, the following may be further included.

The first cell may switch the UP connection of the UE to the third cell, according to measurement reports of the first cell and a neighboring cell, and, measurement reports of the second cell and a neighboring cell sent by the CP connection of the UE. Specifically, if the first cell learns, according to the foregoing measurement reports, that quality of the second cell cannot ensure a QoS requirement of the UP connection of the UE, but the third cell may ensure the QoS requirement of the UP connection of the UE, the first cell may switch the UP connection of the UE to the third cell. The first cell may acquire a configuration parameter of the switched UP connection of the UE. Specifically, that the first cell acquires the configuration parameter of the switched UP connection of the UE may be implemented by using S708 to S710. A base station serving the third cell is the same as the base station serving the first cell; or, a base station serving the third cell is different from the base station serving the first cell.

S708. Send a first switching request.

In this embodiment, the first cell sends the first switching request to a target switching cell of the UP connection of the UE, which is the third cell in this embodiment, where the first switching request is used to request to switch the UP connection of the UE to the third cell.

S709. Determine, according to the first switching request, a configuration parameter of the switched UP connection of the UE.

In this embodiment, the third cell receives the first switching request sent by the first cell, where the first switching request is used to request to switch the UP connection of the UE to the third cell. The third cell may configure a resource for the UP connection of the UE according to the first switching request, that is, the third cell determines, according to the first switching request, a configuration parameter used after the UP connection of the UE is switched to the third cell, that is, the configuration parameter of the switched UP connection of the UE. The configuration parameter of the switched UP connection of the UE is used to indicate a transmission channel and a physical channel that are occupied by the switched UP connection of the UE, the transmission channel occupied by the switched UP connection of the UE is different from the transmission channel occupied by the CP connection of the UE, and the physical channel occupied by the switched UP connection of the UE is different from the physical channel occupied by the CP connection of the UE.

S710. Send a first switching response.

In this embodiment, after determining the configuration parameter of the switched UP connection of the UE, the third cell may generate the first switching response according to the configuration parameter of the switched UP connection, where the first switching response includes the configuration parameter of the switched UP connection of the UE. Correspondingly, the first cell may receive the first switching response sent by the third cell.

S711. Send a first switching command to the UE by using the CP connection of the UE.

In this embodiment, after the first cell receives the first switching response sent by the third cell, the first cell may determine that the third cell already allows the UE to switch the UP connection to the third cell. Then, the first cell may generate the first switching command according to an identifier of the third cell and the configuration parameter of the switched UP connection of the UE in the first switching response, where the first switching command includes the identifier of the third cell and the configuration parameter of the switched UP connection of the UE. Then, the first cell sends the first switching command to the UE by using the CP connection of the UE. Correspondingly, the UE may receive, by using the CP connection of the UE, the first switching command sent by the first cell.

S712. Switch the UP connection of the UE to the third cell according to the first switching command.

In this embodiment, the UE and the third cell may switch, according to the first switching command, the UP connection of the UE from a source cell of the UP connection of the UE to a target switching cell of the UP connection of the UE. In this embodiment, the source cell of the UP connection of the UE is the second cell, that is, the UE switches the UP connection of the UE from the second cell to the third cell. The UE may delete the UP connection to the second cell, and establishes the UP connection to the third cell. In addition, a transmission channel occupied by the UP connection established between the UE and the third cell is different from the transmission channel occupied by the CP connection, and a physical channel occupied by the UP connection established between the UE and the third cell is different from the physical channel occupied by the CP connection.

The CP connection may be carried in an infrequently switched system with large coverage, and high reliability, and the UP connection may be carried in a system with a high rate, an as low as possible transmit or receive point, and a low time delay. In this embodiment of the present invention, because separation between the UP connection and the CP connection of the UE is implemented, the UE does not necessarily switch the CP connection of the UE when switching the UP connection of the UE, thereby implementing separate switching of the UP connection and the CP connection of the UE. The CP connection is carried in a cell with a low frequency and large coverage, which reduces switching times of the CP connection, and a call drop phenomenon can be avoided. The UP connection is carried in a cell with a low frequency and small coverage, which increases a network throughput.

Further, the method in this embodiment may further include the following.

S713. Send a first switching completion command.

In this embodiment, if the UE and the third cell complete a switching process of the UP connection of the UE, the third cell sends the first switching completion command to the first cell, where the first switching completion command is used to indicate that the UE successfully switches the UP connection of the UE to the third cell. Correspondingly, the first cell receives the first switching completion command sent by the third cell.

S714. Trigger, according to the first switching completion command, release of a resource occupied by the UP connection of the UE in the second cell.

In this embodiment, the first cell receives the first switching completion command sent by the third cell, and may learn that the UP connection of the UE is already successfully switched to the third cell. Then, the first cell may trigger, according to the first switching completion command, release of a resource occupied by the UP connection of the UE in a source cell of the UP connection of the UE, where the source cell of the UP connection of the UE in this embodiment is the second cell. Therefore, the first cell triggers release of the resource occupied by the UP connection of the UE in the second cell. For example, the first cell sends a resource release command to the second cell, where the resource release command is used to instruct the second cell to release the resource occupied by the UP connection of the UE in the second cell. The second cell may release, according to the resource release command sent by the first cell, the resource occupied by the UP connection of the UE in the second cell.

According to the wireless connection establishment method provided in this embodiment of the present invention, after separation between a UP connection and a CP connection established by the UE is implemented, a first cell may send a first switching request to a third cell. The third cell sends a first switching response to the first cell after configuring a resource, then the first cell sends a first switching command to the UE by using the CP connection of the UE, and then the UE switches the UP connection of the UE to the third cell according to the first switching command, which implements that the UP connection of the UE may be independently switched, thereby implementing separate switching of the UP connection and the CP connection of the UE.

Figure 11:
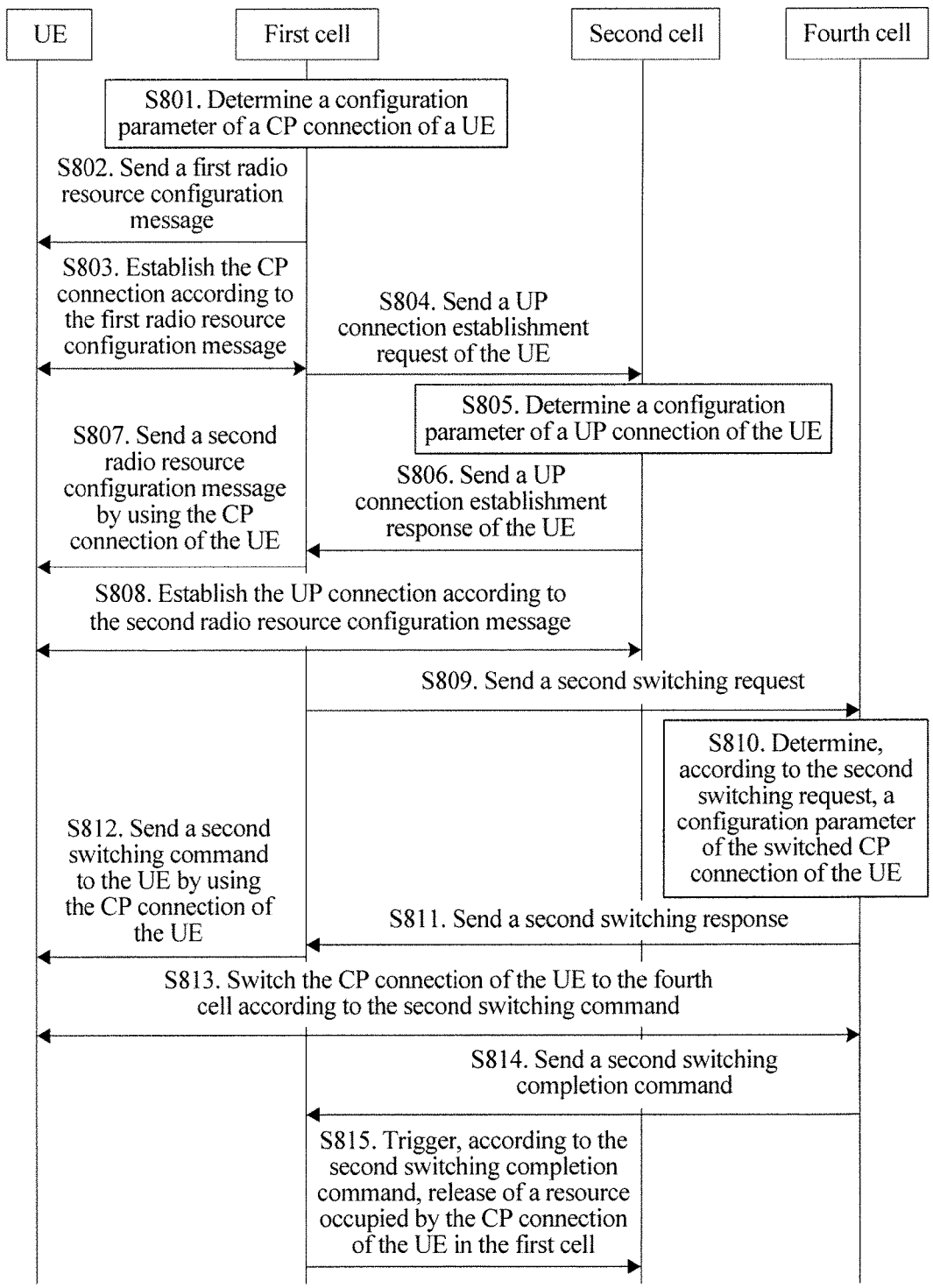
FIG. 11 is a flowchart of embodiment 8 of a wireless connection establishment method according to the present invention.

FIG. 11 is a flowchart of embodiment 8 of a wireless connection establishment method according to the present invention. As shown in FIG. 11, the method in this embodiment is described by using an example in which a UP connection and a CP connection of a UE are established in different cells. A first cell indicates that an execution body is a base station controlling the first cell, a second cell indicates that an execution body is a base station controlling the second cell, and a fourth cell indicates that an execution body is a base station controlling the fourth cell. The method in this embodiment may include:

S801. Determine a configuration parameter of the CP connection of the UE.

S802. Send a first radio resource configuration message.

S803. Establish the CP connection according to the first radio resource configuration message.

In this embodiment, the first cell determines the configuration parameter of the CP connection of the UE in a random access procedure of the UE, where the configuration parameter of the CP connection is used to indicate a transmission channel and a physical channel that are occupied by the CP connection, then includes the configuration parameter of the CP connection in the first radio resource configuration message, and sends the first radio resource configuration message to the UE. Then, the first cell establishes the CP connection to the UE according to the configuration parameter of the CP connection in the first radio resource configuration message.

S804. Send a UP connection establishment request of the UE.

S805. Determine a configuration parameter of the UP connection of the UE.

S806. Send a UP connection establishment response of the UE.

In this embodiment, after the UE and a core network device complete a service negotiation process, if the first cell determines that the UP connection needs to be established in the second cell, the first cell may send the UP connection establishment request of the UE to the second cell, so as to request the second cell to allocate a resource to the UE. After receiving the UP connection establishment request of the UE that is sent by the first cell, the second cell determines the configuration parameter of the UP connection of the UE, and then generates the UP connection establishment response of the UE according to the configuration parameter of the UP connection of the UE. The UP connection establishment response of the UE includes the configuration parameter of the UP connection of the UE. A base station serving the first cell is the same as a base station serving the second cell; or, a base station serving the first cell is different from a base station serving the second cell.

S807. Send a second radio resource configuration message by using the CP connection of the UE.

In this embodiment, the first cell receives the UP connection establishment response of the UE that is sent by the second cell, acquires the configuration parameter of the UP connection of the UE from the UP connection establishment response of the UE, includes the configuration parameter of the UP connection in the second radio resource configuration message, and sends the second radio resource configuration message to the UE by using the CP connection of the UE. The configuration parameter of the UP connection is used to indicate a transmission channel and a physical channel that are occupied by the UP connection, where the transmission channel occupied by the CP connection is different from the transmission channel occupied by the UP connection, and the physical channel occupied by the CP connection is different from the physical channel occupied by the UP connection.

S808. Establish the UP connection according to the second radio resource configuration message.

In this embodiment, the second cell may establish the UP connection of the UE to the UE according to the configuration parameter of the UP connection in the second radio resource configuration message. A transmission channel occupied by the established CP connection is different from a transmission channel occupied by the established UP connection, and a physical channel occupied by the established CP connection is different from a physical channel occupied by the established UP connection, thereby implementing separation between the CP connection and the UP connection of the UE.

In this embodiment, after separation between the CP connection and the UP connection of the UE is implemented, the following may be further included.

The first cell may switch the UP connection of the UE to the third cell, according to measurement reports of the first cell and a neighboring cell, and, measurement reports of the second cell and a neighboring cell sent by the CP connection of the UE. If the first cell learns, according to the foregoing measurement reports, that quality of the first cell cannot ensure a QoS requirement of the CP connection of the UE, but the fourth cell may ensure the QoS requirement of the CP connection of the UE, the first cell may switch the CP connection of the UE to the fourth cell. The first cell may acquire a configuration parameter of the switched CP connection of the UE. Specifically, that the first cell acquires the configuration parameter of the switched CP connection of the UE may be implemented by using S809 to S811. A base station serving the fourth cell is the same as the base station serving the first cell; or, a base station serving the fourth cell is different from the base station serving the first cell.

S809. Send a second switching request.

In this embodiment, the first cell sends the second switching request to a target switching cell of the CP connection of the UE, which is the fourth cell in this embodiment, where the second switching request is used to request to switch the CP connection of the UE to the fourth cell.

S810. Determine, according to the second switching request, a configuration parameter of the switched CP connection of the UE.

In this embodiment, the fourth cell receives the second switching request sent by the first cell, where the second switching request is used to request to switch the CP connection of the UE to the fourth cell. Then, the fourth cell may configure a resource for the CP connection of the UE according to the second switching request, that is, the fourth cell determines, according to the second switching request, a configuration parameter used after the CP connection of the UE is switched to the fourth cell, that is, the configuration parameter of the switched CP connection of the UE. The configuration parameter of the switched CP connection of the UE is used to indicate a transmission channel and a physical channel that are occupied by the switched CP connection of the UE, the transmission channel occupied by the switched CP connection of the UE is different from the transmission channel occupied by the UP connection of the UE, and the physical channel occupied by the switched CP connection of the UE is different from the physical channel occupied by the UP connection of the UE.

S811. Send a second switching response.

In this embodiment, after determining the configuration parameter of the switched CP connection of the UE, the fourth cell may generate the second switching response according to the configuration parameter of the switched CP connection, where the second switching response includes the configuration parameter of the switched CP connection of the UE. Correspondingly, the first cell may receive the second switching response sent by the fourth cell.

S812. Send a second switching command to the UE by using the CP connection of the UE.

In this embodiment, after the first cell receives the second switching response sent by the fourth cell, the first cell may determine that the fourth cell already allows the UE to switch the CP connection to the fourth cell. Then, the first cell may generate the second switching command according to an identifier of the fourth cell and the configuration parameter of the switched CP connection of the UE in the second switching response, where the second switching command includes the identifier of the fourth cell and the configuration parameter of the switched CP connection of the UE. Then, the first cell sends the second switching command to the UE by using the CP connection of the UE. Correspondingly, the UE may receive, by using the CP connection of the UE, the second switching command sent by the first cell.

S813. Switch the CP connection of the UE to the fourth cell according to the second switching command.

In this embodiment, the UE and the fourth cell may switch, according to the second switching command, the CP connection of the UE from a source cell of the CP connection of the UE to a target switching cell of the CP connection of the UE. In this embodiment, the source cell of the CP connection of the UE is the first cell, that is, the UE switches the CP connection of the UE to the fourth cell from the first cell. The UE may delete the CP connection to the first cell, and establishes the CP connection to the fourth cell. In addition, a transmission channel occupied by the CP connection established between the UE and the fourth cell is different from the transmission channel occupied by the UP connection, and a physical channel occupied by the CP connection established between the UE and the fourth cell is different from the physical channel occupied by the UP connection.

The CP connection may be carried in an infrequently switched system with large coverage, and high reliability, and the UP connection may be carried in a system with a high rate, an as low as possible transmit or receive point, and a low time delay. In this embodiment of the present invention, because separation between the UP connection and the CP connection is implemented, the UE does not necessarily switch the UP connection of the UE when switching the CP connection of the UE, thereby implementing separate switching of the CP connection and the UP connection of the UE. The CP connection is carried in a cell with a low frequency and large coverage, which reduces switching times of the CP connection, and a call drop phenomenon can be avoided. The UP connection is carried in a cell with a low frequency and small coverage, which increases a network throughput.

Further, the method in this embodiment may further include the following.

S814. Send a second switching completion command.

In this embodiment, if the UE and the fourth cell complete a switching process of the UP connection of the UE, the fourth cell sends the second switching completion command to the first cell, where the second switching completion command is used to indicate that the UE successfully switches the CP connection of the UE to the fourth cell. Correspondingly, the first cell receives the second switching completion command sent by the fourth cell.

S815. Trigger, according to the second switching completion command, release of a resource occupied by the CP connection of the UE in the first cell.

In this embodiment, the first cell receives the second switching completion command sent by the fourth cell, and may learn that the CP connection of the UE is already successfully switched to the fourth cell. Then, the first cell may trigger, according to the second switching completion command, release of a resource occupied by the CP connection of the UE in a source cell of the CP connection of the UE, where the source cell of the CP connection of the UE in this embodiment is the first cell. Therefore, the first cell triggers release of the resource occupied by the CP connection of the UE in the first cell.

According to the wireless connection establishment method provided in this embodiment of the present invention, after separation between a UP connection and a CP connection established by the UE is implemented, a first cell may send a second switching request to a fourth cell. The fourth cell sends a second switching response to the first cell after configuring a resource, then the first cell sends a second switching command to the UE by using the CP connection of the UE, and then the UE switches the CP connection of the UE to the fourth cell according to the second switching command, which implements that the CP connection of the UE may be independently switched, thereby implementing separate switching of the UP connection and the CP connection of the UE.

Figure 12:
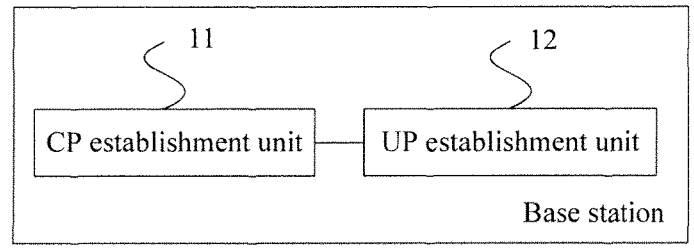
FIG. 12 is a schematic structural diagram of embodiment 1 of a base station according to the present invention.

FIG. 12 is a schematic structural diagram of embodiment 1 of a base station according to the present invention. As shown in FIG. 12, the base station in this embodiment may include: a CP establishment unit 11 and a UP establishment unit 12, where the CP establishment unit 11 is configured to establish a CP connection to a UE according to a configuration parameter of the CP connection, where the configuration parameter of the CP connection is used to indicate a transmission channel occupied by the CP connection and a physical channel occupied by the CP connection; and the UP establishment unit 12 is configured to establish a UP connection to the UE according to a configuration parameter of the UP connection, where the configuration parameter of the UP connection is used to indicate a transmission channel occupied by the UP connection and a physical channel occupied by the UP connection; where the transmission channel occupied by the CP connection is different from the transmission channel occupied by the UP connection, and the physical channel occupied by the CP connection is different from the physical channel occupied by the UP connection.

The base station in this embodiment may be configured to execute the technical solutions that are executed by the base station in the foregoing method embodiments of the present invention, and implementation principles and technical effects thereof are similar. For details, refer to related records in the foregoing method embodiments of the present invention, which are not described herein.

Figure 13:
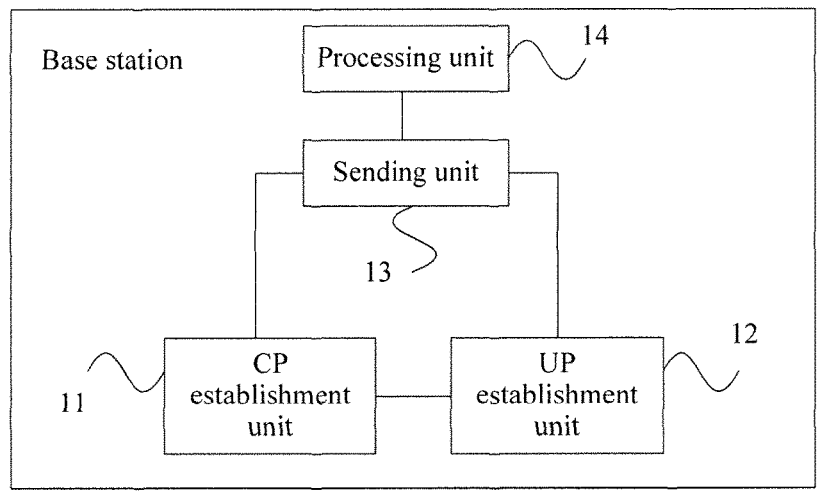
FIG. 13 is a schematic structural diagram of embodiment 2 of a base station according to the present invention.

FIG. 13 is a schematic structural diagram of embodiment 2 of a base station according to the present invention. As shown in FIG. 13, the base station in this embodiment, based on the structure shown in FIG. 12, further includes: a sending unit 13.

In a feasible implementation manner, the sending unit 13 is configured to send the configuration parameter of the CP connection and the configuration parameter of the UP connection to the UE before the CP establishment unit 11 establishes the CP connection to the UE according to the configuration parameter of the CP connection, so that the CP establishment unit 11 establishes the CP connection to the UE and the UP establishment unit 12 establishes the UP connection to the UE.

In another feasible implementation manner, the sending unit 13 is configured to: before the UP establishment unit 12 establishes the UP connection to the UE according to the configuration parameter of the UP connection, send the configuration parameter of the UP connection to the UE by using the CP connection established by the CP establishment unit 11, so that the UP establishment unit 12 establishes the UP connection to the UE.

Optionally, a first cell to which the UE establishes the CP connection is different from a second cell to which the UE establishes the UP connection.

Optionally, a RAT in which the first cell works is different from a RAT in which the second cell works.

Optionally, the base station in this embodiment may further include: a processing unit 14.

In a feasible implementation manner, the processing unit 14 is configured to determine whether the UE needs to transmit service data in a target cell; the sending unit 13 is further configured to send a first establishment command to the UE by using the CP connection after the UP establishment unit 12 establishes the UP connection to the UE according to the configuration parameter of the UP connection and when the processing unit 14 determines that the UE needs to transmit the service data in the target cell, where the first establishment command includes a configuration parameter of a UP connection to be established between the UE and the target cell, the configuration parameter of the UP connection to be established between the UE and the target cell is used to indicate a transmission channel and a physical channel that are occupied by the UP connection to be established between the UE and the target cell, the transmission channel occupied by the UP connection to be established between the UE and the target cell is different from the transmission channel occupied by the CP connection, and the physical channel occupied by the UP connection to be established between the UE and the target cell is different from the physical channel occupied by the CP connection.

In another feasible implementation manner, the processing unit 14 is configured to determine whether the UE needs to transmit control data in a target cell; the sending unit 13 is further configured to send a second establishment command to the UE by using the CP connection after the CP establishment unit 11 establishes the CP connection to the UE according to the configuration parameter of the CP connection and when the processing unit 14 determines that the UE needs to transmit the control data in the target cell, where the second establishment command includes a configuration parameter of a CP connection to be established between the UE and the target cell, the configuration parameter of the CP connection to be established between the UE and the target cell is used to indicate a transmission channel and a physical channel that are occupied by the CP connection to be established between the UE and the target cell, the transmission channel occupied by the CP connection to be established between the UE and the target cell is different from the transmission channel occupied by the UP connection, and the physical channel occupied by the CP connection to be established between the UE and the target cell is different from the physical channel occupied by the UP connection.

The base station in this embodiment may be configured to execute the technical solutions that are executed by the base station in the foregoing method embodiments of the present invention, and implementation principles and technical effects thereof are similar. For details, refer to related records in the foregoing method embodiments of the present invention, which are not described herein.

Figure 14:
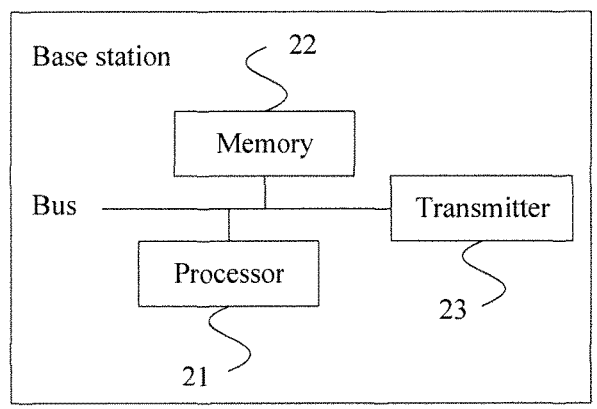
FIG. 14 is a schematic structural diagram of embodiment 3 of a base station according to the present invention.

FIG. 14 is a schematic structural diagram of embodiment 3 of a base station according to the present invention. As shown in FIG. 14, the base station in this embodiment may include: a processor 21 and a memory 22, where the memory 22 is configured to store program code used to execute a wireless connection establishment method, and the processor 21 and the memory 22 may be connected through a bus or in another manner, where connection through a bus is used as an example in FIG. 14. The processor 21 invokes the program code stored in the memory 22, so as to: establish a CP connection to a UE according to a configuration parameter of the CP connection, where the configuration parameter of the CP connection is used to indicate a transmission channel occupied by the CP connection and a physical channel occupied by the CP connection; and establish a UP connection to the UE according to a configuration parameter of the UP connection, where the configuration parameter of the UP connection is used to indicate a transmission channel occupied by the UP connection and a physical channel occupied by the UP connection; where the transmission channel occupied by the CP connection is different from the transmission channel occupied by the UP connection, and the physical channel occupied by the CP connection is different from the physical channel occupied by the UP connection.

Further, the base station in this embodiment may further include a transmitter 23, where the processor 21 and the transmitter 23 may be connected through a bus or in another manner, where connection through a bus is used as an example in FIG. 14.

In a feasible implementation manner, the processor 21 is further configured to control the transmitter 23 to send the configuration parameter of the CP connection and the configuration parameter of the UP connection to the UE before establishing the CP connection to the UE according to the configuration parameter of the CP connection, so that the processor 21 establishes the CP connection and the UP connection to the UE.

In another feasible implementation manner, the processor 21 is further configured to: before establishing the UP connection to the UE according to the configuration parameter of the UP connection, control the transmitter 23 to send the configuration parameter of the UP connection to the UE by using the CP connection established by the processor 21, so that the processor 21 establishes the UP connection to the UE.

Optionally, a first cell to which the UE establishes the CP connection is different from a second cell to which the UE establishes the UP connection.

Optionally, a radio access technology RAT in which the first cell works is different from a RAT in which the second cell works.

Optionally, in a first feasible implementation manner, the processor 21 is further configured to determine whether the UE needs to transmit service data in a target cell; the processor 21 is further configured to control the transmitter 23 to send a first establishment command to the UE by using the CP connection after the processor 21 establishes the UP connection to the UE according to the configuration parameter of the UP connection and when the processor 21 determines that the UE needs to transmit the service data in the target cell, where the first establishment command includes a configuration parameter of a UP connection to be established between the UE and the target cell, the configuration parameter of the UP connection to be established between the UE and the target cell is used to indicate a transmission channel and a physical channel that are occupied by the UP connection to be established between the UE and the target cell, the transmission channel occupied by the UP connection to be established between the UE and the target cell is different from the transmission channel occupied by the CP connection, and the physical channel occupied by the UP connection to be established between the UE and the target cell is different from the physical channel occupied by the CP connection.

In a second feasible implementation manner, the processor 21 is further configured to determine whether the UE needs to transmit control data in a target cell; the processor 21 is further configured to control the transmitter 23 to send a second establishment command to the UE by using the CP connection after the processor 21 establishes the CP connection to the UE according to the configuration parameter of the CP connection and when the processor 21 determines that the UE needs to transmit the control data in the target cell, where the second establishment command includes a configuration parameter of a CP connection to be established between the UE and the target cell, the configuration parameter of the CP connection to be established between the UE and the target cell is used to indicate a transmission channel and a physical channel that are occupied by the CP connection to be established between the UE and the target cell, the transmission channel occupied by the CP connection to be established between the UE and the target cell is different from the transmission channel occupied by the UP connection, and the physical channel occupied by the CP connection to be established between the UE and the target cell is different from the physical channel occupied by the UP connection.

The base station in this embodiment may be configured to execute the technical solutions that are executed by the base station in the foregoing method embodiments of the present invention, and implementation principles and technical effects thereof are similar. For details, refer to related records in the foregoing method embodiments of the present invention, which are not described herein.

Figure 15:
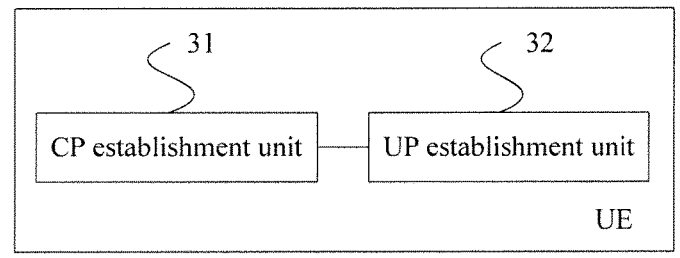
FIG. 15 is a schematic structural diagram of embodiment 1 of a UE according to the present invention.

FIG. 15 is a schematic structural diagram of embodiment 1 of a UE according to the present invention. As shown in FIG. 15, the UE in this embodiment may include: a CP establishment unit 31 and a UP establishment unit 32, where the CP establishment unit 31 is configured to establish a CP connection to a base station according to a configuration parameter of the CP connection, where the configuration parameter of the CP connection is used to indicate a transmission channel occupied by the CP connection and a physical channel occupied by the CP connection; and the UP establishment unit 32 is configured to establish a UP connection to the base station according to a configuration parameter of the UP connection, where the configuration parameter of the UP connection is used to indicate a transmission channel occupied by the UP connection and a physical channel occupied by the CP connection; where the transmission channel occupied by the CP connection is different from the transmission channel occupied by the UP connection, and the physical channel occupied by the CP connection is different from the physical channel occupied by the UP connection.

The UE in this embodiment may be configured to execute the technical solutions that are executed by the UE in the foregoing method embodiments of the present invention, and implementation principles and technical effects thereof are similar. For details, refer to related records in the foregoing method embodiments of the present invention, which are not described herein.

Figure 16:
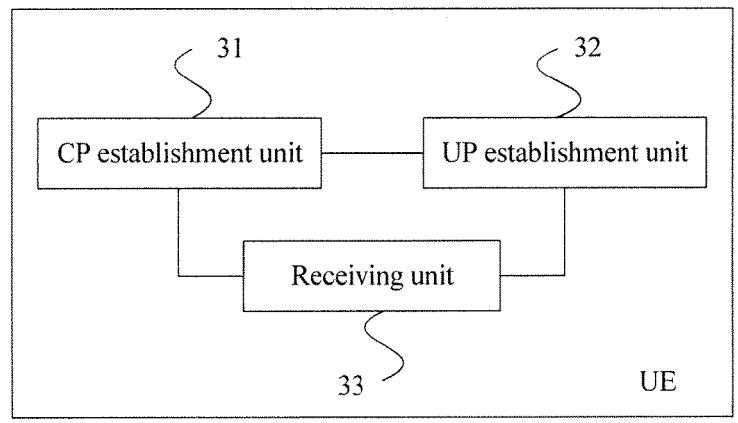
FIG. 16 is a schematic structural diagram of embodiment 2 of a UE according to the present invention.

FIG. 16 is a schematic structural diagram of embodiment 2 of a UE according to the present invention. As shown in FIG. 16, the UE in this embodiment, based on the structure shown in FIG. 15, further includes: a receiving unit 33.

In a feasible implementation manner, the receiving unit 33 is configured to: before the CP establishment unit 31 establishes the CP connection to the base station according to the configuration parameter of the CP connection, receive the configuration parameter of the CP connection and the configuration parameter of the UP connection that are sent by the base station.

In another feasible implementation manner, the receiving unit 33 is configured to: before the UP establishment unit 32 establishes the UP connection to the base station according to the configuration parameter of the UP connection, receive, by using the CP connection established by the CP establishment unit 31, the configuration parameter of the UP connection that is sent by the base station.

Optionally, a first cell to which the UE establishes the CP connection is different from a second cell to which the UE establishes the UP connection.

Optionally, a radio access technology RAT in which the first cell works is different from a RAT in which the second cell works.

Optionally, in a first feasible implementation manner, the receiving unit 33 is further configured to: after the UP establishment unit 32 establishes the UP connection to the base station according to the configuration parameter of the UP connection, receive, by using the CP connection, a first establishment command sent by the base station, where the first establishment command includes a configuration parameter of a UP connection to be established between the UE and a target cell, and the configuration parameter of the UP connection to be established between the UE and the target cell is used to indicate a transmission channel and a physical channel that are occupied by the UP connection to be established between the UE and the target cell; and the UP establishment unit 32 is further configured to establish a UP connection to the target cell according to the first establishment command received by the receiving unit 33; where the transmission channel occupied by the UP connection to be established between the UE and the target cell is different from the transmission channel occupied by the CP connection, and the physical channel occupied by the UP connection to be established between the UE and the target cell is different from the physical channel occupied by the CP connection.

In a second feasible implementation manner, the receiving unit 33 is configured to: after the CP establishment unit 31 establishes the CP connection to the base station according to the configuration parameter of the CP connection, receive, by using the CP connection, a second establishment command sent by the base station, where the second establishment command includes a configuration parameter of a CP connection to be established between the UE and a target cell, and the configuration parameter of the CP connection to be established between the UE and the target cell is used to indicate a transmission channel and a physical channel that are occupied by the CP connection to be established between the UE and the target cell; and the CP establishment unit 31 is further configured to establish a CP connection to the target cell according to the second establishment command received by the receiving unit 33; where the transmission channel occupied by the CP connection to be established between the UE and the target cell is different from the transmission channel occupied by the UP connection, and the physical channel occupied by the CP connection to be established between the UE and the target cell is different from the physical channel occupied by the UP connection.

The UE in this embodiment may be configured to execute the technical solutions that are executed by the UE in the foregoing method embodiments of the present invention, and implementation principles and technical effects thereof are similar. For details, refer to related records in the foregoing method embodiments of the present invention, which are not described herein.

Figure 17:
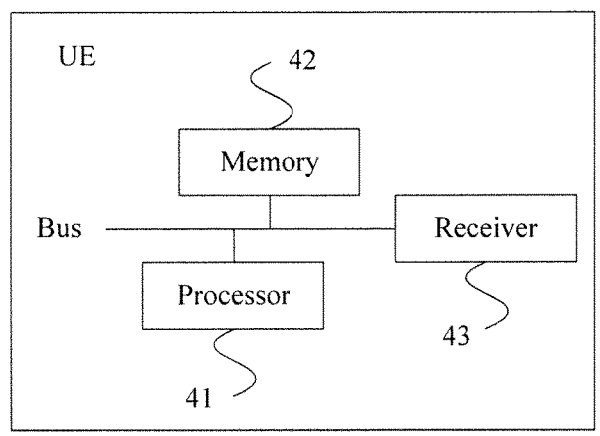
FIG. 17 is a schematic structural diagram of embodiment 3 of a UE according to the present invention.

FIG. 17 is a schematic structural diagram of embodiment 3 of a UE according to the present invention. As shown in FIG. 17, the UE in this embodiment may include: a processor 41 and a memory 42, where the processor 41 and the memory 42 may be connected through a bus or in another manner, where connection through a bus is used as an example in FIG. 17. The memory 42 is configured to store program code used to execute a wireless connection establishment method. The processor 41 executes the program code stored in the memory 42, so as to: establish a CP connection to a base station according to a configuration parameter of the CP connection, where the configuration parameter of the CP connection is used to indicate a transmission channel occupied by the CP connection and a physical channel occupied by the CP connection; and establish a UP connection to the base station according to a configuration parameter of the UP connection, where the configuration parameter of the UP connection is used to indicate a transmission channel occupied by the UP connection and a physical channel occupied by the UP connection; where the transmission channel occupied by the CP connection is different from the transmission channel occupied by the UP connection, and the physical channel occupied by the CP connection is different from the physical channel occupied by the UP connection.

Further, the UE in this embodiment may further include a receiver 43, where the processor 41 and the receiver 43 may be connected through a bus or in another manner, where connection through a bus is used as an example in FIG. 17.

In a feasible implementation manner, the processor 41 is further configured to: before establishing the CP connection to the base station according to the configuration parameter of the CP connection, control the receiver 43 to receive the configuration parameter of the CP connection and the configuration parameter of the UP connection that are sent by the base station.

In another feasible implementation manner, the processor 41 is further configured to: before establishing the UP connection to the base station according to the configuration parameter of the UP connection, control the receiver 43 to receive, by using the CP connection, the configuration parameter of the UP connection that is sent by the base station.

Optionally, a first cell to which the UE establishes the CP connection is different from a second cell to which the UE establishes the UP connection.

Optionally, a RAT in which the first cell works is different from a RAT in which the second cell works.

Optionally, in a first feasible implementation manner, the processor 41 is further configured to: after establishing the UP connection to the base station according to the configuration parameter of the UP connection, control the receiver 43 to receive, by using the CP connection, a first establishment command sent by the base station, where the first establishment command includes a configuration parameter of a UP connection to be established between the UE and a target cell, and the configuration parameter of the UP connection to be established between the UE and the target cell is used to indicate a transmission channel and a physical channel that are occupied by the UP connection to be established between the UE and the target cell; and the processor 41 is further configured to establish a UP connection to the target cell according to the first establishment command received by the receiver 43; where the transmission channel occupied by the UP connection to be established between the UE and the target cell is different from the transmission channel occupied by the CP connection, and the physical channel occupied by the UP connection to be established between the UE and the target cell is different from the physical channel occupied by the CP connection.

In a second feasible implementation manner, the processor 41 is further configured to: after establishing the CP connection to the base station according to the configuration parameter of the CP connection, control the receiver 43 to receive, by using the CP connection, a second establishment command sent by the base station, where the second establishment command includes a configuration parameter of a CP connection to be established between the UE and a target cell, and the configuration parameter of the CP connection to be established between the UE and the target cell is used to indicate a transmission channel and a physical channel that are occupied by the CP connection to be established between the UE and the target cell; and the processor 41 is further configured to establish a CP connection to the target cell according to the second establishment command received by the receiver 43; where the transmission channel occupied by the CP connection to be established between the UE and the target cell is different from the transmission channel occupied by the UP connection, and the physical channel occupied by the CP connection to be established between the UE and the target cell is different from the physical channel occupied by the UP connection.

The UE in this embodiment may be configured to execute the technical solutions that are executed by the UE in the foregoing method embodiments of the present invention, and implementation principles and technical effects thereof are similar. For details, refer to related records in the foregoing method embodiments of the present invention, which are not described herein.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A wireless connection establishment method, comprising:
    determining, by a base station, different transmission channels to be occupied by a control plane (CP) connection and a user plane (UP) connection to a user equipment (UE), and different physical channels to be occupied by the CP connection and the UP connection to the UE, a transmission channel used to define Quality of Service (QoS) information and a physical channel used to define physical resource information including one or more of a carrier, a scrambling code, a channelization code, or duration information, by,
    establishing the CP connection to the UE according to a configuration parameter to establish the CP connection, wherein the configuration parameter to establish the CP connection is used to indicate to the UE a transmission channel occupied by the CP connection and a physical channel occupied by the CP connection; and
    establishing the UP connection to the UE according to a configuration parameter to establish the UP connection, wherein the configuration parameter to establish the UP connection is used to indicate to the UE a transmission channel determined to be occupied by the UP connection and different from the transmission channel occupied by the CP connection, and a physical channel determined to be occupied by the UP connection and different from the physical channel occupied by the CP connection.

2. The method according to claim 1, wherein before the establishing, by the base station, the CP connection to the UE according to a configuration parameter of the CP connection, further comprising:
    sending, by the base station, the configuration parameter of the CP connection and the configuration parameter of the UP connection to the UE, for establishing the CP connection and the UP connection to the UE.

3. The method according to claim 1, wherein before the establishing, by the base station, the UP connection to the UE according to a configuration parameter of the UP connection, further comprising:
    sending, by the base station, the configuration parameter of the UP connection to the UE by using the CP connection, for establishing the UP connection to the UE.

4. The method according to claim 1, wherein a first cell to which the UE establishes the CP connection is different from a second cell to which the UE establishes the UP connection.

5. The method according to claim 4, wherein a radio access technology (RAT) in which the first cell works is different from a RAT in which the second cell works.

6. The method according to claim 1, wherein after the establishing, by the base station, the UP connection to the UE according to a configuration parameter of the UP connection, further comprising:
　determining, by the base station, that the UE needs to transmit service data in a target cell,
　sending, by the base station, a first establishment command to the UE by using the CP connection, wherein
　the first establishment command comprises a configuration parameter of a UP connection to be established between the UE and the target cell, the configuration parameter of the UP connection to be established between the UE and the target cell is used to indicate a transmission channel and a physical channel that are occupied by the UP connection to be established between the UE and the target cell, the transmission channel occupied by the UP connection to be established between the UE and the target cell is different from the transmission channel occupied by the CP connection, and the physical channel occupied by the UP connection to be established between the UE and the target cell is different from the physical channel occupied by the CP connection.

7. The method according to claim 1, after the establishing, by the base station, the CP connection to the UE according to a configuration parameter of the CP connection, further comprising:
　determining, by the base station, that the UE needs to transmit control data in a target cell,
　sending, by the base station, a second establishment command to the UE by using the CP connection, wherein
　the second establishment command comprises a configuration parameter of a CP connection to be established between the UE and the target cell, the configuration parameter of the CP connection to be established between the UE and the target cell is used to indicate a transmission channel and a physical channel that are occupied by the CP connection to be established between the UE and the target cell, the transmission channel occupied by the CP connection to be established between the UE and the target cell is different from the transmission channel occupied by the UP connection, and the physical channel occupied by the CP connection to be established between the UE and the target cell is different from the physical channel occupied by the UP connection.

8. A base station, comprising a processor and a memory, wherein
　the memory is configured to store program code used to execute a wireless connection establishment method,
　the processor is configured to invokes the program code stored in the memory, facilitating performance of the following;
　determining different transmission channels to be occupied by a control plane (CP) connection and a user plane (UP) connection to a user equipment (UE), and different physical channels to be occupied by the CP connection and the UP connection to the UE, a transmission channel used to define Quality of Service (QoS) information and a physical channel used to define physical resource information including one or more of a carrier, a scrambling code, a channelization code, or duration information, by,
　establishing the CP connection to the UE according to a configuration parameter to establish the CP connection, wherein the configuration parameter to establish the CP connection is used to indicate to the UE a transmission channel occupied by the CP connection and a physical channel occupied by the CP connection; and
　establishing the UP connection to the UE according to a configuration parameter to establish the UP connection, wherein the configuration parameter to establish the UP connection is used to indicate to the UE a transmission channel determined to be occupied by the UP connection and different from the transmission channel occupied by the CP connection, and a physical channel determined to be occupied by the UP connection and different from the physical channel occupied by the CP connection.

9. The base station according to claim 8, further comprising a transmitter, wherein:
　the processor is further configured to control the transmitter to send the configuration parameter of the CP connection and the configuration parameter of the UP connection to the UE before establishing the CP connection to the UE according to the configuration parameter of the CP connection, for establishing the CP connection to the UE and the UP connection to the UE by the processor.

10. The base station according to claim 8, further comprising a transmitter, wherein:
　the processor is configured to: before establishing the UP connection to the UE according to the configuration parameter of the UP connection, control the transmitter to send the configuration parameter of the UP connection to the UE by using the CP connection established by processor, for establishing the UP connection to the UE by the processor.

11. The base station according to claim 8, wherein a first cell to which the UE establishes the CP connection is different from a second cell to which the UE establishes the UP connection.

12. The base station according to claim 11, wherein a radio access technology (RAT) in which the first cell works is different from a RAT in which the second cell works.

13. The base station according to claim 9, wherein
　the processor is further configured to determine whether the UE needs to transmit service data in a target cell, and
　the processor is further configured to control the transmitter to send a first establishment command to the UE by using the CP connection after the processor establishes the UP connection to the UE according to the configuration parameter of the UP connection, wherein
　the first establishment command comprises a configuration parameter of a UP connection to be established between the UE and the target cell, the configuration parameter of the UP connection to be established between the UE and the target cell is used to indicate a transmission channel and a physical channel that are occupied by the UP connection to be established between the UE and the target cell, the transmission channel occupied by the UP connection to be established between the UE and the target cell is different from the transmission channel occupied by the CP connection, and the physical channel occupied by the UP connection to be established between the UE and the target cell is different from the physical channel occupied by the CP connection.

14. The base station according to claim 9, wherein:
the processor is further configured to determine whether the UE needs to transmit control data in a target cell, and
the processor is further configured to control the transmitter to send a second establishment command to the UE by using the CP connection after the processor establishes the CP connection to the UE according to the configuration parameter of the CP connection, wherein
the second establishment command comprises a configuration parameter of a CP connection to be established between the UE and the target cell, the configuration parameter of the CP connection to be established between the UE and the target cell is used to indicate a transmission channel and a physical channel that are occupied by the CP connection to be established between the UE and the target cell, the transmission channel occupied by the CP connection to be established between the UE and the target cell is different from the transmission channel occupied by the UP connection, and the physical channel occupied by the CP connection to be established between the UE and the target cell is different from the physical channel occupied by the UP connection.

15. A non-transitory machine-readable medium having stored thereon, a computer program comprising at least one code section for distributing data, the at least one code section being executable by a base station for causing the base station to perform the following:
determining different transmission channels to be occupied by a control plane (CP) connection and a user plane (UP) connection to a user equipment (UE), and different physical channels to be occupied by the CP connection and the UP connection to the UE, a transmission channel used to define Quality of Service (QoS) information and a physical channel used to define physical resource information including one or more of a carrier, a scrambling code, a channelization code, or duration information, by,
establishing the CP connection to the UE according to a configuration parameter to establish the CP connection, wherein the configuration parameter to establish the CP connection is used to indicate to the UE a transmission channel occupied by the CP connection and a physical channel occupied by the CP connection; and
establishing UP connection to the UE according to a configuration parameter to establish the UP connection, wherein the configuration parameter to establish the UP connection is used to indicate to the UE a transmission channel determined to be occupied by the UP connection and different from the transmission channel occupied by the CP connection, and a physical channel determined to be occupied by the UP connection and different from the physical channel occupied by the CP connection.

16. The medium according to claim 15, wherein the computer program further includes instructions for:
before establishing the CP connection to the UE according to a configuration parameter of the CP connection, sending, the configuration parameter of the CP connection and the configuration parameter of the UP connection to the UE, for establishing the CP connection and the UP connection to the UE.

17. The medium according to claim 15, wherein the computer program further includes instructions for:
before establishing the UP connection to the UE according to a configuration parameter of the UP connection, sending the configuration parameter of the UP connection to the UE by using the CP connection, for establishing the UP connection to the UE.

18. The medium according to claim 15, wherein a first cell to which the UE establishes the CP connection is different from a second cell to which the UE establishes the UP connection.

19. The medium according to claim 15, wherein the computer program further includes instructions for:
after establishing the UP connection to the UE according to a configuration parameter of the UP connection,
determining that the UE needs to transmit service data in a target cell, and
sending a first establishment command to the UE by using the CP connection, wherein the first establishment command comprises a configuration parameter of a UP connection to be established between the UE and the target cell, the configuration parameter of the UP connection to be established between the UE and the target cell is used to indicate a transmission channel and a physical channel that are occupied by the UP connection to be established between the UE and the target cell, the transmission channel occupied by the UP connection to be established between the UE and the target cell is different from the transmission channel occupied by the CP connection, and the physical channel occupied by the UP connection to be established between the UE and the target cell is different from the physical channel occupied by the CP connection.

20. The medium according to claim 15, the computer program further includes instructions for:
after the establishing the CP connection to the UE according to a configuration parameter of the CP connection,
determining that the UE needs to transmit control data in a target cell, and
sending a second establishment command to the UE by using the CP connection, wherein the second establishment command comprises a configuration parameter of a CP connection to be established between the UE and the target cell, the configuration parameter of the CP connection to be established between the UE and the target cell is used to indicate a transmission channel and a physical channel that are occupied by the CP connection to be established between the UE and the target cell, the transmission channel occupied by the CP connection to be established between the UE and the target cell is different from the transmission channel occupied by the UP connection, and the physical channel occupied by the CP connection to be established between the UE and the target cell is different from the physical channel occupied by the UP connection.

* * * * *